US008321710B2

(12) United States Patent  
Yamamoto et al.

(10) Patent No.: US 8,321,710 B2  
(45) Date of Patent: Nov. 27, 2012

(54) DEVICE, METHOD AND COMPUTER PROGRAM PRODUCT FOR CAUSING AN INPUT DEVICE TO ENTER A LOW POWER STATE AND SENDING A COMMAND THAT DISABLES DISPLAY OF A GRAPHICAL USER INTERFACE

(75) Inventors: Kazuyuki Yamamoto, Kanagawa (JP); Hideo Niikura, Tokyo (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/636,938

(22) Filed: Dec. 14, 2009

(65) Prior Publication Data

US 2010/0218024 A1 Aug. 26, 2010

(30) Foreign Application Priority Data

Feb. 20, 2009 (JP) ................................. 2009-037458

(51) Int. Cl.  
*G06F 1/00* (2006.01)  
*H04N 5/44* (2011.01)

(52) U.S. Cl. .................... 713/323; 713/324; 348/734

(58) Field of Classification Search .................. 713/323, 713/324  
See application file for complete search history.

(56) References Cited

U.S. PATENT DOCUMENTS

| 7,489,299 | B2 | 2/2009 | Liberty et al. | |
| 7,675,453 | B2* | 3/2010 | Kang et al. | 341/176 |
| 2004/0166904 | A1* | 8/2004 | Kuo | 455/574 |
| 2009/0185081 | A1* | 7/2009 | Ueno et al. | 348/734 |
| 2010/0013551 | A1* | 1/2010 | Reams | 327/544 |
| 2011/0175626 | A1* | 7/2011 | Lee et al. | 324/629 |
| 2011/0211131 | A1* | 9/2011 | Kikuchi et al. | 348/734 |

FOREIGN PATENT DOCUMENTS

| EP | 0 429 391 A1 | 5/1991 |
| JP | 6-7371 | 1/1994 |
| JP | 2000-270236 | 9/2000 |
| JP | 2007-509448 A | 4/2007 |

OTHER PUBLICATIONS

Japanese Office Action issued on Dec. 21, 2010 in corresponding Japanese Application No. 2009-037458.  
U.S. Appl. No. 12/628,526, filed Dec. 1, 2009, Yamamoto.  
U.S. Appl. No. 12/637,005, filed Dec. 14, 2009, Yamamoto, et al.  
U.S. Appl. No. 12/687,401, filed Jan. 14, 2010, Yamamoto, et al.  
U.S. Appl. No. 12/631,948, filed Dec. 7, 2009, Niikura, et al.

* cited by examiner

*Primary Examiner* — Suresh Suryawanshi  
(74) *Attorney, Agent, or Firm* — Oblon, Spivak, McClelland, Maier & Neustadt, L.L.P.

(57) ABSTRACT

An input device includes an operation unit, a sending unit, and a power control unit. The operation unit is configured to be held by a user and to be operated in a three-dimensional free space so as to remotely operate an information processing apparatus. The sending unit is configured to send a command that disables display of a graphical user interface of the information processing apparatus when the operation unit is placed, and to send a command that enables display of the graphical user interface of the information processing apparatus when a button of the operation unit is operated. The power control unit is configured to cause the input device to enter a low power consumption state when the operation unit is placed.

18 Claims, 17 Drawing Sheets

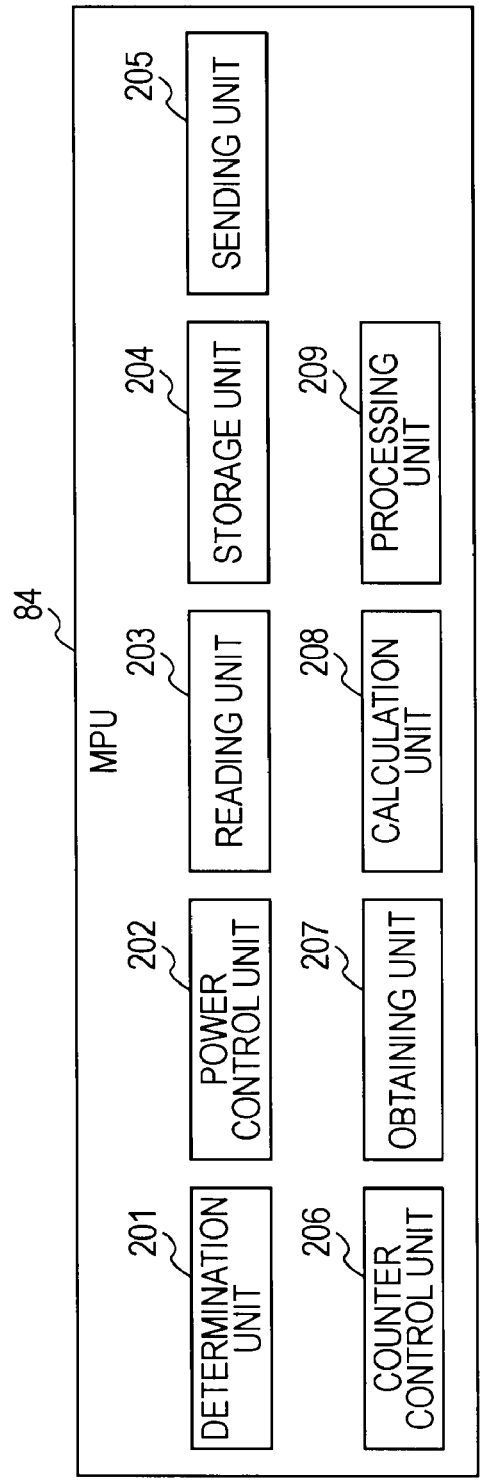
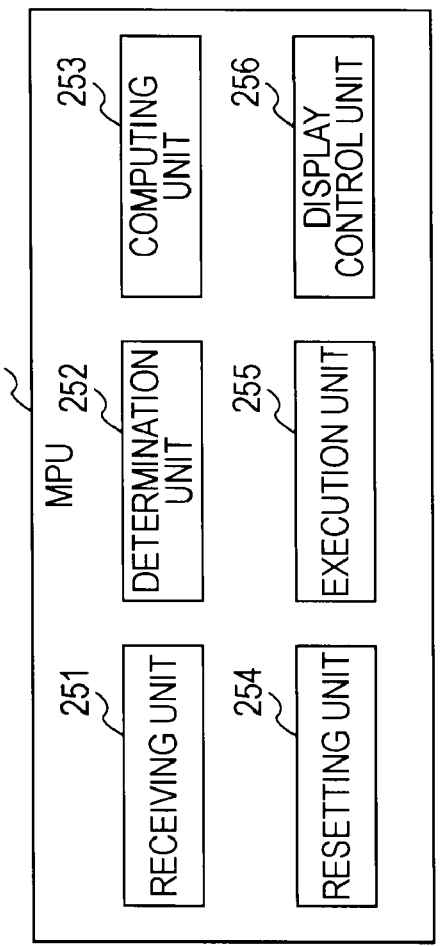

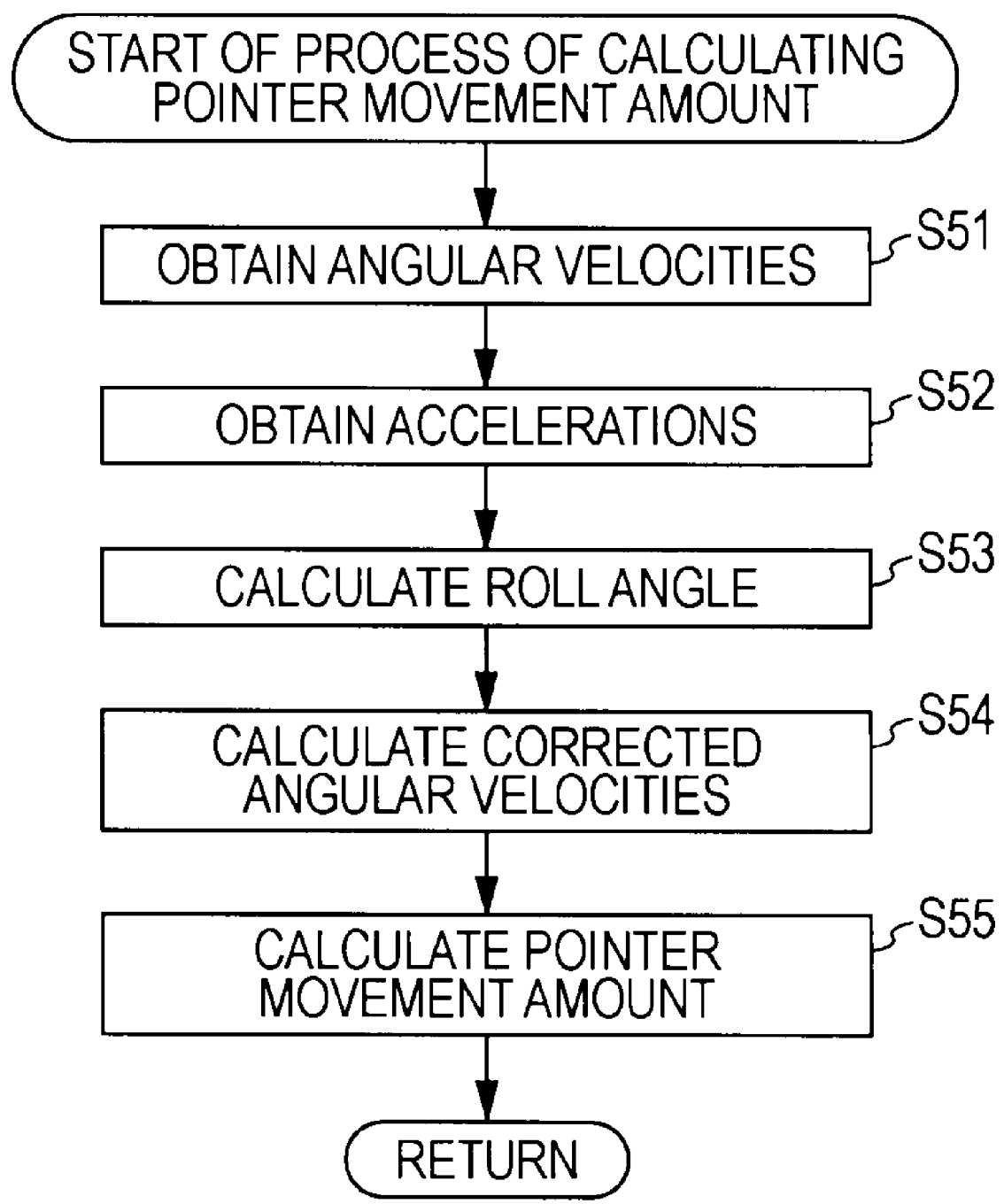

DEVICE, METHOD AND COMPUTER PROGRAM PRODUCT FOR CAUSING AN INPUT DEVICE TO ENTER A LOW POWER STATE AND SENDING A COMMAND THAT DISABLES DISPLAY OF A GRAPHICAL USER INTERFACE

BACKGROUND OF THE INVENTION

1. Field of the Invention

The present invention relates to an input device and method, an information processing system, and a program, and more particularly, to an input device and method, an information processing system, and a program that suppress deterioration of the ease of operation and reduce power consumption.

2. Description of the Related Art

The operation of television receivers is often controlled using graphical user interfaces. A graphical user interface is generally displayed on a television receiver when a user operates a predetermined button of a remote controller. When the button is operated again, the graphical user interface which has been displayed up to that moment is erased.

However, when the user wishes to display the graphical user interface using such a remote controller, the user holds the remote controller and operates the button. When the user wishes to erase the graphical user interface, the user holds the remote controller and operates the button. In both of these cases, it is necessary for the user to perform two operations, which means that the operation is bothersome.

For example, Japanese Unexamined Patent Application Publication No. 2000-270236 proposes the following. When a remote controller is being held in a hand, a graphical user interface is displayed. When the remote controller is placed on a table, the graphical user interface is erased.

SUMMARY OF THE INVENTION

If a graphical user interface is displayed when a remote controller is being held in a hand and if the graphical user interface is erased when the remote controller is not being held in a hand, when, for example, the user simply holds the remote controller to reduce the volume, the graphical user interface is displayed. This degrades the ease of operation rather than improving it.

In the case of a so-called aerial remote controller that is held by a user and is operated in the three-dimensional free space, an angular velocity sensor or an acceleration sensor is often used to detect a user operation. In such an aerial remote controller, holding of the remote controller may also be detected by using the angular velocity sensor or the acceleration sensor.

Since remote controllers operate on batteries, it is necessary to reduce the power consumption as much as possible. When a remote controller remains unused for a long time, a microprocessing unit (MPU) that controls the operation often enters a halt mode (a mode in which, for example, the clock supplying time is reduced, and the MPU will be activated upon a trigger from the outside). When the remote controller is not being held in a hand, that is, when the remote controller is not being used, the power supply to the angular velocity sensor or the acceleration sensor may be stopped.

However, when the power supply to the angular velocity sensor or the acceleration sensor is stopped, holding of the remote controller becomes undetectable. As a result, it is necessary to continuously supply power to the angular velocity sensor or the acceleration sensor even when the remote controller is not in use. This results in an increase in the power consumption, and the batteries are more quickly consumed.

It is desirable to provide techniques that suppress degradation of the ease of operation and reduces power consumption.

According to an embodiment of the present invention, an input device includes an operation unit, a sending unit, and a power control unit. The operation unit is configured to be held by a user and to be operated in a three-dimensional free space so as to remotely operate an information processing apparatus. The sending unit is configured to send a command that disables display of a graphical user interface of the information processing apparatus when the operation unit is placed, and to send a command that enables display of the graphical user interface of the information processing apparatus when a button of the operation unit is operated. The power control unit is configured to cause the input device to enter a low power consumption state when the operation unit is placed.

According to an embodiment of the present invention, an operation unit is held by a user and operated in a three-dimensional free space so as to remotely operate an information processing apparatus. A sending unit sends a command that disables display of a graphical user interface of the information processing apparatus when the operation unit is placed, and sends a command that enables display of the graphical user interface of the information processing apparatus when a button of the operation unit is operated. The power control unit causes the input device to enter a low power consumption state when the operation unit is placed.

According to an embodiment of the present invention, degradation of the ease of operation can be suppressed, and power consumption can be reduced.

BRIEF DESCRIPTION OF THE DRAWINGS

FIG. 5 is a block diagram illustrating a functional structure of an MPU in the input device in the embodiment;

FIG. 6 is a block diagram illustrating a functional structure of an MPU in a television receiver in the embodiment;

FIG. 8 is a flowchart describing a process of calculating a pointer movement amount;

DESCRIPTION OF THE PREFERRED EMBODIMENTS

Figure 1:
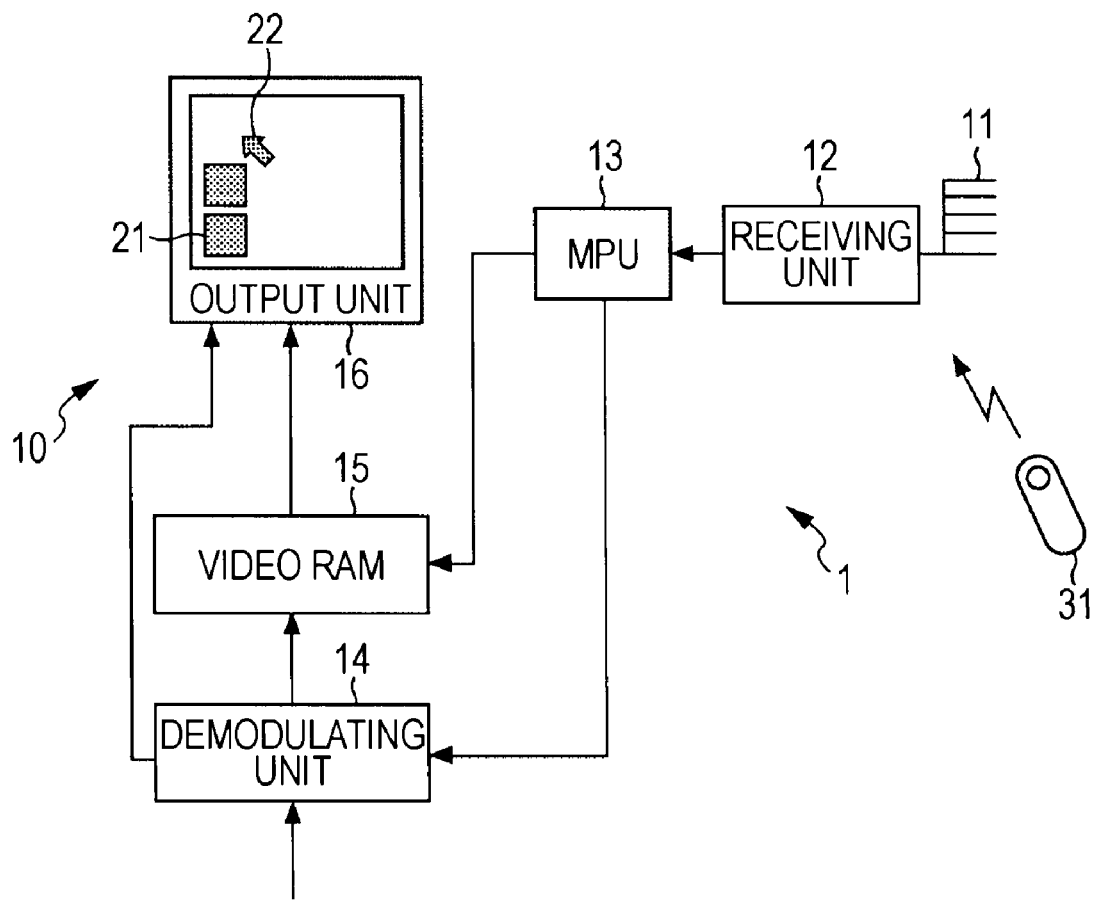
FIG. 1 is a block diagram illustrating a configuration of an information processing system according to an embodiment of the present invention.

The best mode for carrying out the present invention (hereinafter referred to as "embodiments") will be described below. The description will be given in the following order:
First Embodiment (System Configuration)
First Embodiment (Structure of Input Device)
First Embodiment (Electrical Structure of Input Device)
First Embodiment (Functional Structure of MPU)
First Embodiment (First Command Sending Process Performed by Input Device)
First Embodiment (Process of Calculating Pointer Movement Amount)
First Embodiment (Placing Detecting Process)
First Embodiment (Display Controlling Process Performed by Television Receiver)
Second Embodiment (Second Command Sending Process Performed by Input Device)
Third Embodiment (Structure of Input Device)
Fourth Embodiment (Structure of Input Device)
Fifth Embodiment (Structure of Input Device)
Modifications
First Embodiment
System Configuration FIG. 1 is a block diagram illustrating a configuration of an information processing system according to an embodiment of the present invention.

An information processing system 1 includes a television receiver 10 serving as an information processing apparatus and an input device 31 serving as a pointing device or a remote controller that remotely controls the television receiver 10.

The television receiver 10 includes an antenna 11, a receiving unit 12, a microprocessing unit (MPU) 13, a demodulating unit 14, a video random-access memory (RAM) 15, and an output unit 16.

The antenna 11 receives an electric wave from the input device 31. The receiving unit 12 demodulates the electric wave received via the antenna 11, and outputs the demodulated signal to the MPU 13. The MPU 13 controls each unit on the basis of an instruction from the input device 31.

The demodulating unit 14 demodulates a television broadcast signal received via a television broadcast receiving antenna (not illustrated), and outputs a demodulated video signal to the video RAM 15 and a demodulated audio signal to the output unit 16. The video RAM 15 combines an image based on the video signal supplied from the demodulating unit 14 with an image of on-screen data supplied from the MPU 13, such as a pointer and an icon, and outputs the combined image to an image display unit included in the output unit 16. The output unit 16 displays an image by using the image display unit and outputs sound by using an audio output unit including a loudspeaker and the like.

In a display example illustrated in FIG. 1, the image display unit of the output unit 16 displays an icon 21 and a pointer 22. The input device 31 is operated by a user when, for example, the user wishes to change the display position of the icon 21 or when the user wishes to remotely control the television receiver 10.

Structure of Input Device

Figure 2:
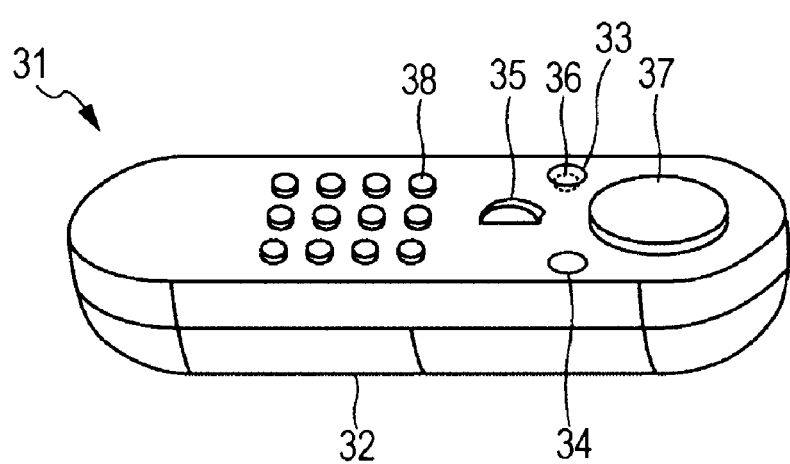
FIG. 2 is a perspective view illustrating an external structure of an input device in the embodiment.

FIG. 2 is a perspective view illustrating an external structure of the input device in the embodiment. The input device 31 includes a main body 32 serving as an operation unit to be operated by a user to generate an operation signal for controlling the information processing apparatus. Buttons 33 and 34 corresponding to the left button and the right button of a mouse are provided on the top face of the main body 32.

The button 33 corresponds to the left button of a general mouse, and the button 34 corresponds to the right button. For example, when the palm of a right hand touches and holds the bottom face facing the top face on which the button 33 and the like of the input device 31 are provided, the button 33 is operated by the index finger, and the button 34 and a jog dial 35 are operated by the thumb. Any command can be generated when a button is operated. For example, commands may be set in the following manner:
Press the button 33 once: left click: select
Press the button 33 long: drag: move icon
Press the button 33 twice: double click: open a file or folder or execute a program
Press the button 34 once: right click: display menu
Rotate the jog dial 35: scroll
Press the jog dial 35: decide When commands are set as above, the user can use the input device 31 with the same or similar feelings to a general personal computer (PC) mouse.

A proximity detector 36 that is operated to permit a pointer movement is provided below the button 33. The proximity detector 36 detects when the proximity detector 36 is touched or approached by a finger of a user. The proximity detector 36 can be configured using a push switch, a photo-sensor, or a capacitive sensor.

The button 33 and the proximity detector 36 are frequently used. Therefore, when the button 33 and the proximity detector 36 are arranged so as to overlap each other, the user can use both of the button 33 and the proximity detector 36 as if the button 33 and the proximity detector 36 were a two-level switch. This improves the ease of operation.

A button 37 that functions as a direction button operated vertically and horizontally and as a decision button is provided on the top face of the main body 32. Furthermore, buttons 38 including buttons corresponding to numerals and a graphical user interface (GUI) start button are provided on the top face of the main body 32.

Figure 3:
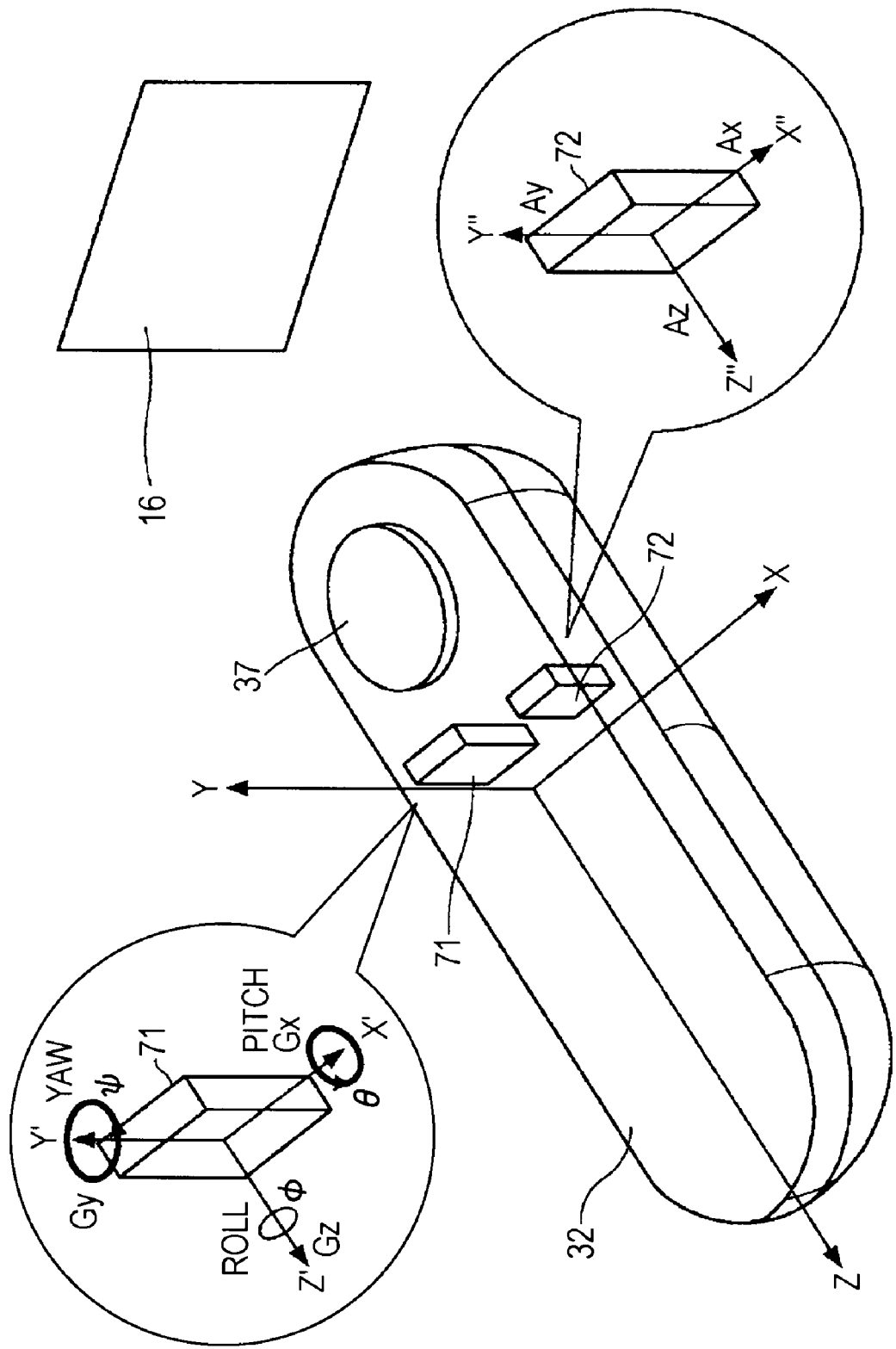
FIG. 3 is a diagram illustrating an internal structure of the input device in the embodiment.

FIG. 3 is a diagram illustrating an internal structure of the input device in the embodiment. An angular velocity sensor 71 and an acceleration sensor 72 which are manufactured by using the micro-electro-mechanical systems (MEMS) technology are provided in the input device 31. The X-, Y-, and Z-axes are absolute axes orthogonal to one another in the three-dimensional space. The Y-axis is a vertical axis, and the X-axis and the Z-axis are horizontal axes. The Z-axis is an axis facing toward the user. The X'-, Y'-, and Z'-axes are orthogonal axes of the angular velocity sensor 71. The X"-, Y"-, and Z"-axes are orthogonal axes of the acceleration sensor 72. The X'-, Y'-, and Z'-axes are parallel to the X"-, Y"-, and Z"-axes, respectively.

Typically, the head (the upper right edge in FIG. 3) of the main body 32 is directed toward the output unit 16 of the television receiver 10, which is placed in front of the main body 32, and the overall main body 32 is operated by the user in any direction as the user wishes in the three-dimensional space. In this case, the angular velocity sensor 71 including a dual-axis vibration angular velocity sensor detects angular velocities of a pitch angle θ and a yaw angle ψ that rotate about a pitch rotation axis and a yaw rotation axis that are parallel to the X'-axis and the Y'-axis, respectively. Alternatively, instead of the vibration angular velocity sensor, a geomagnetic angular velocity sensor may be used. The acceleration sensor 72 detects accelerations in the X"-axis and the Y"-axis directions. The acceleration sensor 72 can detect an acceleration as a vector quantity. A three-axis acceleration sensor that have three sensitive axes, namely, the X"-axis, the Y"-axis, and the Z"-axis, may be used as the acceleration sensor 72.

The input device 31 is held in a hand by the user, and the overall input device 31 is moved and operated in any direction as the user wishes in the three-directional free space. That is, the input device 31 functions as an aerial remote controller. Instead of being used while being placed on a desk, the input device 31 is moved and operated in space in any direction as the user wishes. The input device 31 detects the operated direction and outputs an operation signal in accordance with the operated direction. When one of the buttons 33 to 38 is operated, the input device 31 outputs a corresponding operation signal.

Electrical Structure of Input Device

Figure 4:
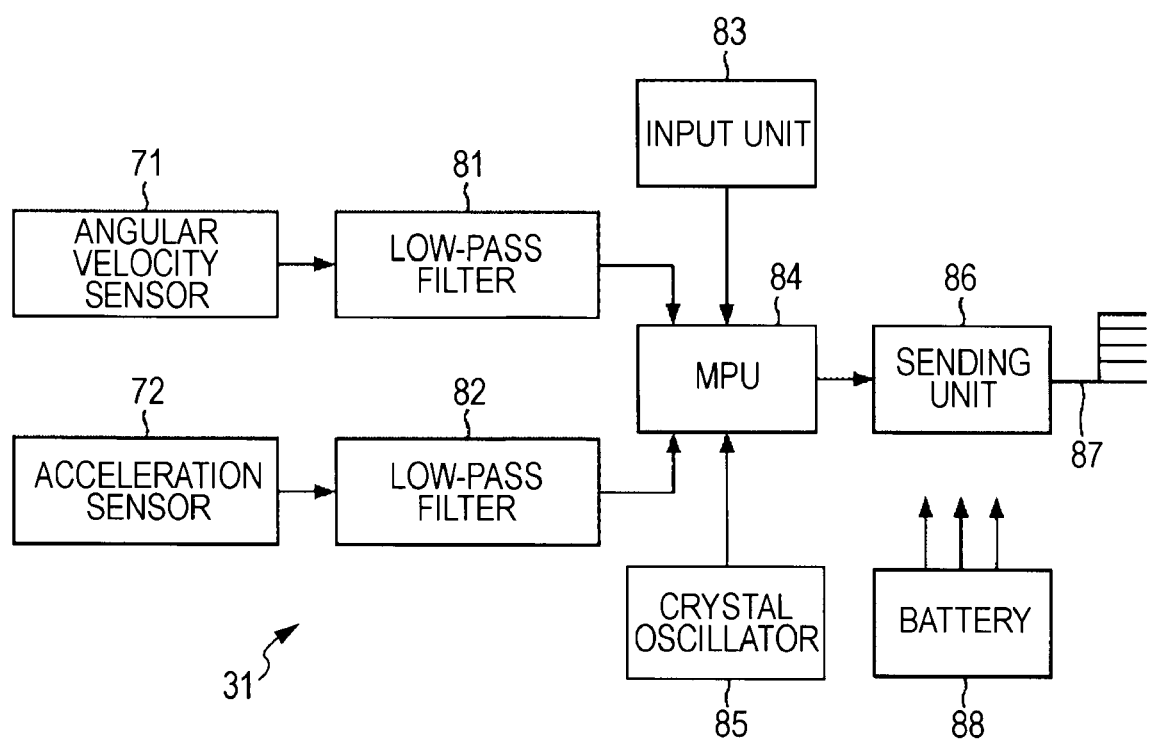
FIG. 4 is a block diagram illustrating an electrical structure of the input device in the embodiment.

FIG. 4 is a block diagram illustrating an electrical structure of the input device in the embodiment.

When the overall main body 32 is operated by the user, the angular velocity sensor 71 and the acceleration sensor 72 detect angular velocities and accelerations when the operation is made. Detection data of the angular velocity sensor 71 is subjected to a low-pass filter 81 for preventing aliasing, and unnecessary high-frequency components are removed from the detection data. Then, the detection data is supplied to an MPU 84. Detection data of the acceleration sensor 72 is subjected to a low-pass filter 82 for preventing aliasing, and unnecessary high-frequency components are removed from the detection data. Then, the detection data is supplied to the MPU 84.

When operated by the user, an input unit 83 including the buttons 33 to 38 outputs a signal corresponding to the operation to the MPU 84. A crystal oscillator 85 generates a clock signal and supplies the clock signal to the MPU 84.

The MPU 84 generates an operation signal corresponding to an input, and outputs, from a sending unit 86, the operation signal by using an electric wave via an antenna 87 to the television receiver 10. The electric wave is received by the television receiver 10 by using the antenna 11.

A battery 88 supplies necessary power to each unit.

Functional Structure of MPU

FIG. 5 is a block diagram illustrating a functional structure of the MPU in the input device in the embodiment. The MPU 84 in the input device 31 includes a determination unit 201, a power control unit 202, a reading unit 203, a storage unit 204, a sending unit 205, a counter control unit 206, an obtaining unit 207, a calculation unit 208, and a processing unit 209.

The determination unit 201 performs various determination processes. The power control unit 202 controls power supply to each unit. The reading unit 203 reads editing data. The storage unit 204 stores editing data and the like. The sending unit 205 sends a command and the like to the television receiver 10. The counter control unit 206 performs a counting operation by using an internal counter. The obtaining unit 207 obtains an operation movement amount, button information, and the like. The calculation unit 208 calculates a roll angle, a corrected angular velocity, a pointer movement amount, and the like. The processing unit 209 performs a termination process.

FIG. 6 is a block diagram illustrating a functional structure of the MPU in the television receiver in the embodiment. The MPU 13 in the television receiver 10 includes a receiving unit 251, a determination unit 252, a computing unit 253, a resetting unit 254, an execution unit 255, and a display control unit 256.

The receiving unit 251 receives a signal sent from the input device 31. The determination unit 252 performs various determinations. The computing unit 253 computes a virtual pointer position. The resetting unit 254 resets the virtual pointer position. The execution unit 255 executes a command. The display control unit 256 controls display.

First Command Sending Process Performed by Input Device

Figure 7:
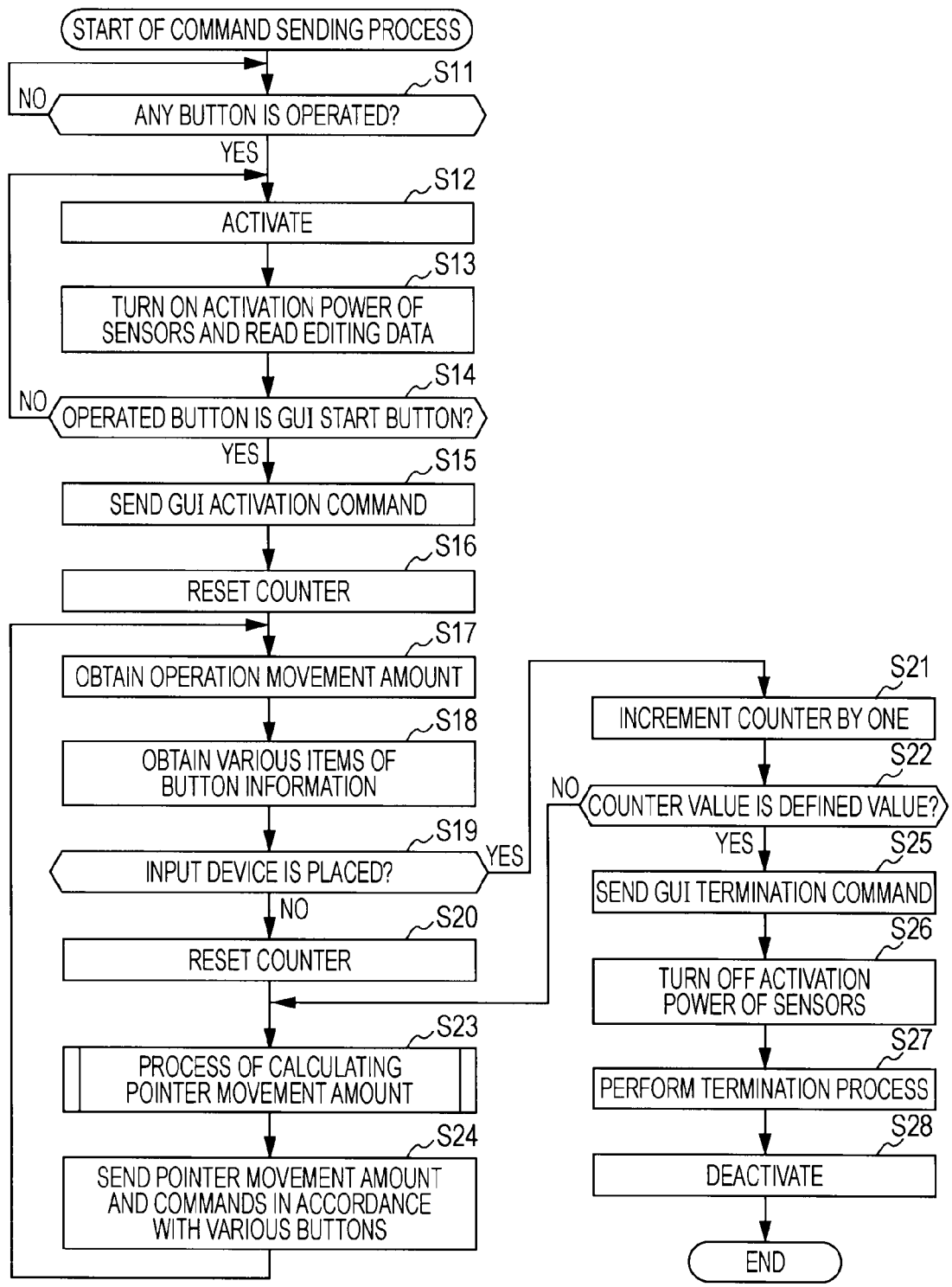
FIG. 7 is a flowchart describing a command sending process.

FIG. 7 is a flowchart describing a command sending process. Referring now to FIG. 7, the command sending process performed by the input device 31 will be described.

In step S11, the determination unit 201 determines whether any of the buttons 33 to 38 is operated. When it is determined that none of the buttons 33 to 38 is operated, a determination standby state is maintained.

When any of the buttons 33 to 38 is operated, in step S12, the power control unit 202 activates the input device 31. Specifically, a stop mode that has been set up to that point is cancelled, and an operating mode is set. In the stop mode, the supply of a clock signal to the MPU 84 is stopped. When the stop mode is cancelled, the supply of a clock signal is started. As a result, the MPU 84 becomes able to operate.

That is, when a button of the input device 31 is operated, this operation functions as an external trigger to apply voltage to a predetermined terminal of the MPU 84, thereby activating the MPU 84. In other words, when the MPU 84 is activated, it is detected that a button has been operated.

In step S13, the power control unit 202 turns on the activation power of the sensors, namely, the angular velocity sensor 71 and the acceleration sensor 72. Also, the reading unit 203 reads editing data that has been stored as non-volatile data in the storage unit 204. That is, the angular velocity sensor 71 and the acceleration sensor 72 are controlled so as to become able to detect angular velocities and accelerations, respectively. The editing data includes, for example, a direct current (DC) center value and sensitivity.

When a sensor outputs a detection value in terms of a voltage value, the DC center value represents the reference for an output voltage range. For example, when a detected angular velocity is 0, the output voltage of the angular velocity sensor 71 becomes the DC center value. When a detected angular velocity is positive, the output voltage of the angular velocity sensor 71 becomes a value corresponding to a detection value greater than the DC center value. When a detected angular velocity is negative, the output voltage of the angular velocity sensor 71 becomes a value corresponding to a detection value less than the DC center value.

The sensitivity defines the level of an output voltage per unit detection value.

The editing data of the acceleration sensor 72 is data similar to the editing data of the angular velocity sensor 71.

In step S14, the determination unit 201 determines whether the operated button is the GUI start button. As described above, at least one of the buttons 38 is the GUI start button operated to enable GUI display of the television receiver 10.

When it is determined that the operated button is not the GUI start button, the flow returns to step S12, and the process from step S12 onward is repeated.

The process may be terminated when the time in which the process from step S12 to step S14 is repeated reaches a preset time.

When it is determined in step S14 that the operated button is the GUI start button that is a button dedicated to enable GUI display, the sending unit 205 sends a GUI activation command in step S15. Specifically, a GUI activation command output from the sending unit 205 of the MPU 84 is amplified by the sending unit 86, and the amplified GUI activation command is sent in terms of an electric wave via the antenna 87 to the television receiver 10. This command is received by the television receiver 10 in step S151 and executed in step S156 of a flowchart illustrated in FIG. 13, which will be described later. As a result, GUI display of the television receiver 10 is enabled.

The command sent here may not necessarily be a command as a matter of form and may be a signal that eventually enables the television receiver 10 to use GUI display.

In step S16, the counter control unit 206 resets a counter. That is, the value of a counter that performs a counting operation is reset to 0 in order to measure a time in which the input device 31 has been placed on a table or the like.

In step S17, the obtaining unit 207 obtains an operation movement amount. Specifically, the angular velocities detected by the angular velocity sensor 71 and the accelerations detected by the acceleration sensor 72 are obtained as an operation movement amount. In step S18, the obtaining unit 207 obtains various items of button information. That is, information corresponding to a button(s) operated by a user is obtained.

In step S19, the determination unit 201 determines whether the input device 31 has been placed. The details of a placing detecting process of detecting whether the input device 31 has been placed will be described with reference to FIG. 12 later. In the present embodiment, the placing detecting process is performed on the basis of the angular velocities detected by the angular velocity sensor 71 or the accelerations detected by the acceleration sensor 72.

When it is determined that the input device 31 has not been placed, that is, when it is determined that the input device 31 is being held by the user, the counter control unit 206 resets the counter in step S20.

In step S23, a process of calculating a pointer movement amount is executed. The details of the process are illustrated in the flowchart of FIG. 8.

Process of Calculating Pointer Movement Amount

FIG. 8 is a flowchart describing a process of calculating a pointer movement amount.

Figure 9A:
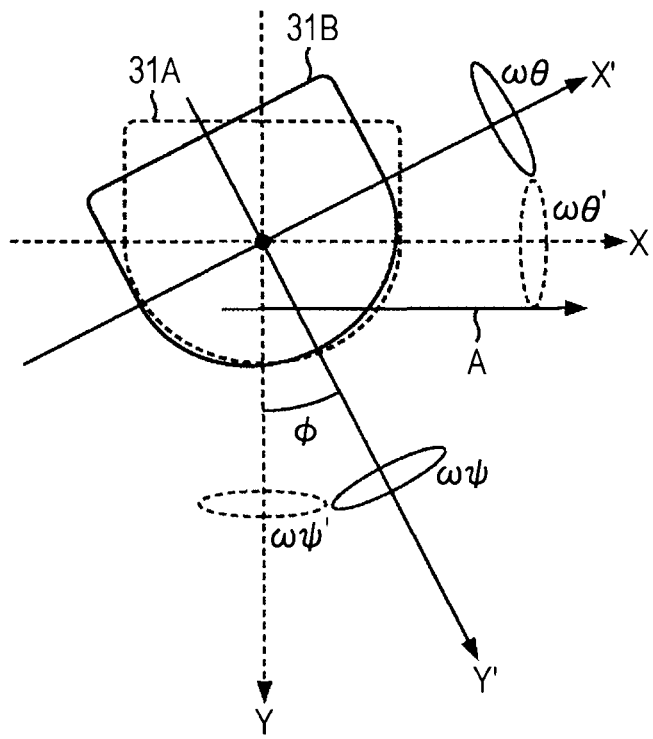
FIGS. 9A and 9B are diagrams describing a roll angle.

In step S51 of FIG. 8, the obtaining unit 207 obtains angular velocities. That is, as illustrated in FIG. 9A, the angular velocity sensor 71 outputs an angular velocity $\omega\psi(t)$ about the Y'-axis and an angular velocity $\omega\theta(t)$ about the X'-axis of motions that are generated when the user holds and moves/operates the input device 31 in the three-dimensional free space. For the purpose of preventing aliasing from occurring, the low-pass filter 81 removes unnecessary high frequency components from the angular velocities ($\omega\psi(t)$, $\omega\theta(t)$) output from the angular velocity sensor 71. The obtaining unit 207 obtains low frequency components included in the angular velocities ($\omega\psi(t)$, $\omega\theta(t)$) from which the unnecessary high frequency components have been removed by the low-pass filter 81. Specifically, the angular velocities ($\omega\psi(t)$, $\omega\theta(t)$) are converted from analog to digital (A-to-D) by an A/D converter included in the MPU 84 and taken in.

Figure 9B:
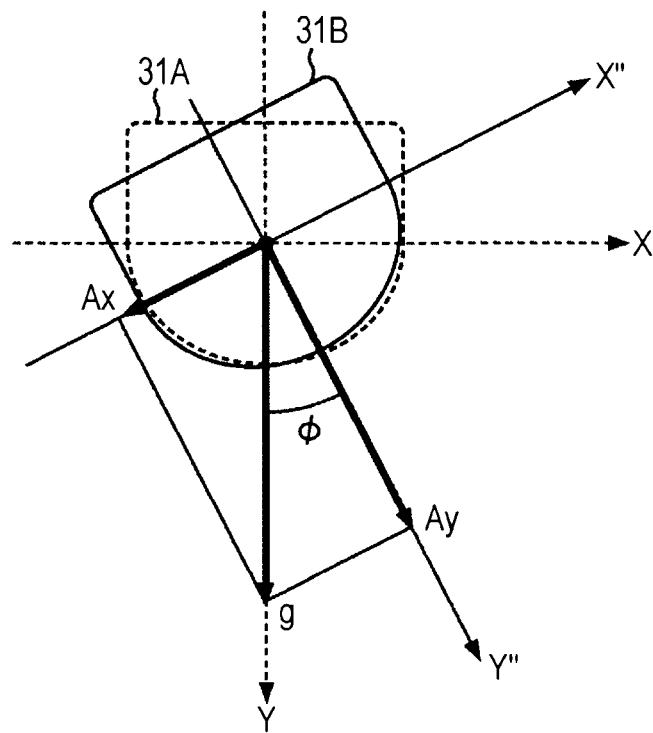

In step S52, the obtaining unit 207 obtains accelerations. That is, as illustrated in FIG. 9B, the acceleration sensor 72 outputs accelerations (Ax(t), Ay(t)) of motions in the X"-axis and the Y"-axis, that are generated when the user operates the input device 31 in the three-dimensional free space. For the purpose of preventing aliasing from occurring, the low-pass filter 82 removes unnecessary high frequency components from the accelerations (Ax(t), Ay(t)) output from the acceleration sensor 72. The obtaining unit 207 obtains low frequency components included in the accelerations (Ax(t), Ay(t)) from which the unnecessary high frequency components have been removed by the low-pass filter 82. Specifically, the accelerations (Ax(t), Ay(t)) are converted from analog to digital (A-to-D) by the A/D converter included in the MPU 84 and taken in.

In step S53, the calculation unit 208 calculates a roll angle. A roll angle $\phi$ is calculated from accelerations (Ax, Ay) on the basis of the next equation (1):

$$\phi = \arctan(Ax/Ay) \tag{1}$$

where Ax denotes a component detected in the X"-axis by the acceleration sensor 72, and Ay denotes a component detected in the Y"-axis by the acceleration sensor 72.

That is, as illustrated in FIG. 9B, when the input device 31, which is in a horizontal state indicated by reference 31A, is rotated by only the roll angle $\phi$ about the Z'-axis (FIG. 3), which is indicated by reference 31B, the acceleration components (Ax, Ay) satisfy the following equation (2):

$$\tan\phi = Ax/Ay \tag{2}$$

Therefore, equation (1) is derived.

In step S54, the calculation unit 208 calculates corrected angular velocities. Corrected angular velocities ($\omega\psi'$, $\omega\theta'$) are calculated from the following equation:

$$\begin{bmatrix} \omega_{\psi'} \\ \omega_{\theta'} \end{bmatrix} = \begin{bmatrix} \cos\phi & -\sin\phi \\ \sin\phi & \cos\phi \end{bmatrix} \begin{bmatrix} \omega_\psi \\ \omega_\theta \end{bmatrix} \tag{3}$$

As illustrated in FIG. 9A, the corrected angular velocities ($\omega\psi'$, $\omega\theta'$) are angular velocities about the Y-axis and the X-axis when the input device 31, which is actually held by the user as indicated by reference 31B, is rotated clockwise by only the roll angle $\phi$ to enter a horizontal state indicated by reference 31A. Angular velocities ($\omega\psi$, $\omega\theta$) are actually detected angular velocities about the Y'-axis and the X'-axis when the input device 31, which is in a horizontal state indicated by reference 31B, is rotated counterclockwise by only the roll angle $\phi$.

In step S55, the calculation unit 208 calculates a pointer movement amount. A pointer movement amount is calculated by, for example, multiplying the corrected angular velocities ($\omega\psi$, $\omega\theta$) by a detection time.

By calculating a pointer movement amount in accordance with the corrected angular velocities ($\omega\psi'$, $\omega\psi'$) in this manner, the movement amount of a pointer displayed on the television receiver 10, which is based on the calculated pointer movement amount, becomes associated with the actual user operation. Therefore, the user is suppressed from feeling awkwardness.

Figure 10:
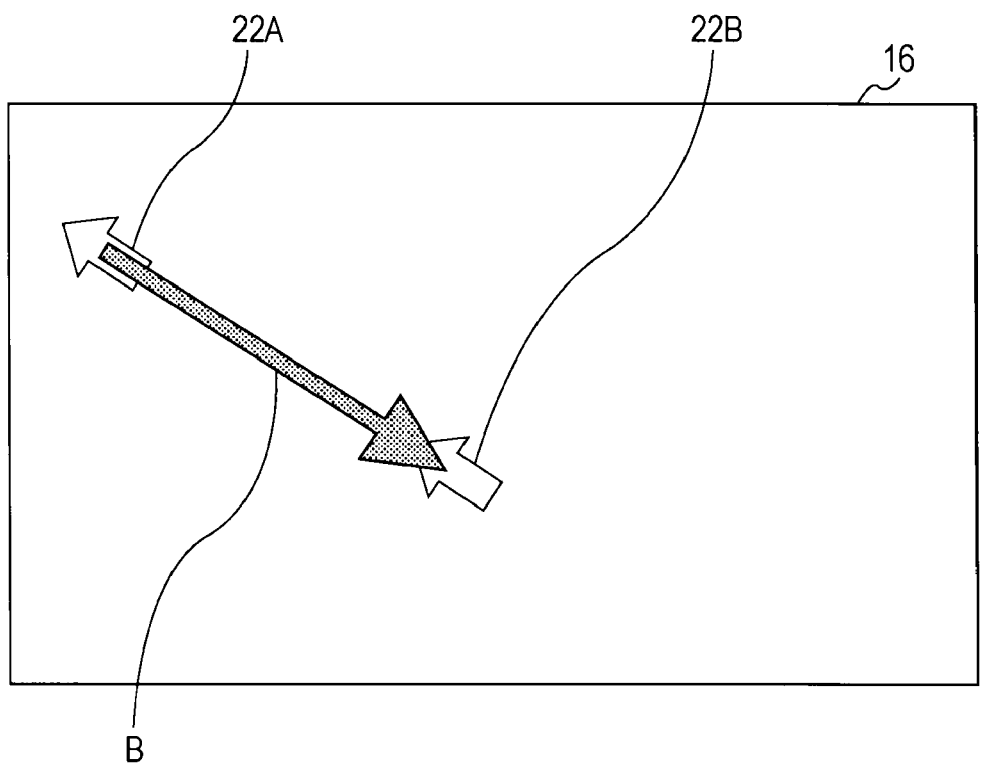
FIG. 10 is a diagram describing a pointer movement when correction based on a roll angle is not performed.

That is, as illustrated in FIG. 9A, it is assumed that the input device 31, which is in a horizontal state indicated by reference 31A, is operated in the arrow A direction (direction parallel to the X-axis) while being tilted by only the roll angle $\phi$. In this case, the arrow A direction is a direction tilted clockwise by only the roll angle $\phi$ with respect to the X'-axis of the acceleration sensor 72. Therefore, when the angular velocities are not corrected, as illustrated in FIG. 10, a pointer 22A is moved in the arrow B direction (lower rightward direction by the roll angle $\phi$ from the horizontal direction) and is displayed as a pointer 22B. Even though the user has made a horizontal operation, the pointer 22 is moved in the lower rightward direction. Thus, the user feels awkwardness.

Figure 11:
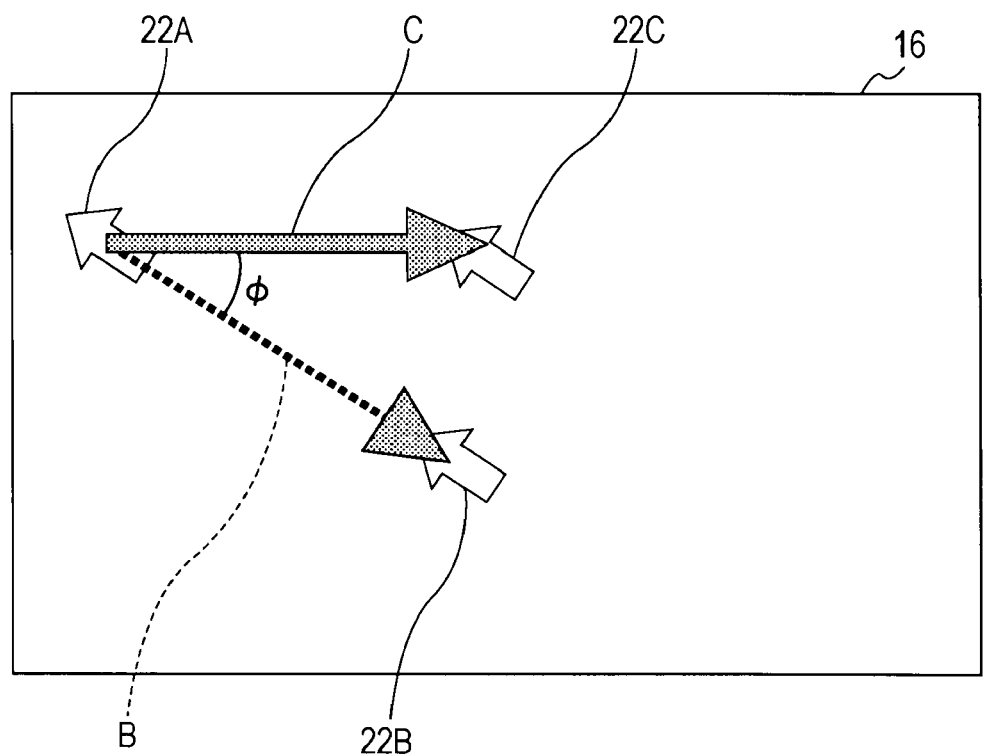
FIG. 11 is a diagram describing a pointer movement when correction based on a roll angle is performed.

In contrast, when the angular velocities are corrected only for the roll angle φ, as illustrated in FIG. 11, the pointer 22A is moved in the arrow C direction (horizontal direction) and is displayed as a pointer 22C. Since the arrow C direction is parallel to the arrow A direction, the pointer 22 is moved in a direction in which the user has operated. Thus, the user does not feel awkwardness.

Referring back to FIG. 7, when the pointer movement amount is calculated in step S23 as above, the sending unit 205 sends the pointer movement amount and commands in accordance with various buttons in step S24. Commands in accordance with various buttons are commands generated on the basis of the button information which is obtained in step S18 and which corresponds to the operated button(s).

That is, the pointer movement amount and commands output from the sending unit 205 of the MPU 84 are amplified by the sending unit 86, and sent as electric waves via the antenna 87 to the television receiver 10. The pointer movement amount and commands are received by the television receiver 10 (step S151 of FIG. 13 described later). As a result, the pointer 22 is moved and displayed in the operated direction on the television receiver 10, and processes corresponding to the commands are executed (step S156 of FIG. 13).

Thereafter, the flow returns to step S17, and the process from step S17 onward is repeated.

When it is determined in step S19 that the input device 31 has been placed, the counter control unit 206 increments the counter only by one in step S21. That is, the operation for measuring a time in which the input device 31 has been placed is started.

In step S22, the determination unit 201 determines whether the counter value is a defined value. When the counter value incremented in step S21 has not reached the preset defined value yet (when a certain time has not elapsed since the input device 31 was placed), the flow proceeds to step S23, and a pointer movement amount is calculated as above. In step S24, the pointer movement amount and commands are sent to the television receiver 10. Thereafter, the flow returns to step S17, and the process from step S17 onward is repeated.

By performing the time measuring operation as above, even when the input device 31 is placed, a GUI termination command sending process in step S25 described later is not promptly executed. As a result, even when the user briefly places the input device 31 on a table while operating the GUI, the GUI display is prevented from suddenly being erased. That is, the ease of operation is improved.

When it is determined that the counter value is the defined value in step S22, that is, when the certain time (first time) has elapsed, the sending unit 205 sends a GUI termination command in step S25.

Figure 13:
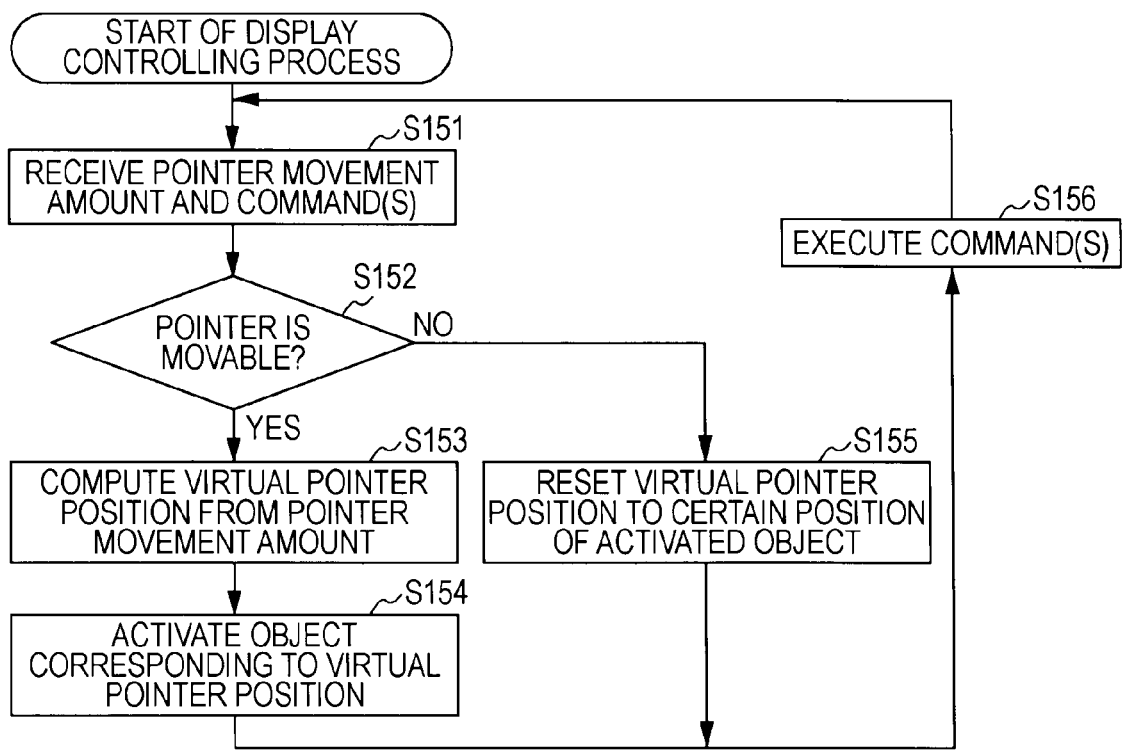
FIG. 13 is a flowchart describing a display controlling process.

When the television receiver 10 receives the GUI termination command in step S151 of FIG. 13, the television receiver 10 executes a process corresponding to the GUI termination command in step S156. That is, the GUI display is disabled. Therefore, the user can terminate the GUI display without operating a button, and the ease of operation is improved.

The GUI display may be disabled by completely erasing the GUI display, vaguely displaying the GUI in a manner that does not obstruct other displayed images, or displaying a small version of the GUI in a corner of the output unit 16.

The command sent here may not necessarily be a command as a matter of form and may be a signal that eventually disables the ability of the television receiver 10 to use GUI display.

In step S26, the power control unit 202 turns off the activation power of the sensors 71 and/or 72. That is, in the present embodiment, when the first time elapses, the activation power of the sensors 71 and/or 72 is turned off. Specifically, the activation power of both of or at least one of the angular velocity sensor 71 and the acceleration sensor 72 is tuned off. In other words, a low power consumption state is set. The angular velocity sensor 71 consumes a greater amount of power than the acceleration sensor 72. When the activation power of only one of the angular velocity sensor 71 and the acceleration sensor 72 is to be turned off, if the activation power of the angular velocity sensor 71 is turned off, the power consumption can be more greatly reduced. In step S27, the processing unit 209 performs a termination process. At this time, the storage unit 204 stores data to be saved, such as the most recent editing values of the sensors 71 and 72.

Since the storage is performed by the storage unit 204, if the storage unit 204 is configured using an inexpensive flash memory, the number of times data can be rewritten is limited. As in the present embodiment, because of the certain standby time in the process from step S19 to step S22, when the input device 31 is placed and then held by the user again, the termination process in step S27 is not performed. This can reduce the number of times data is unnecessarily written to the flash memory.

When the difference between a new editing value and an already-stored editing value is less than or equal to a reference value, the editing value may not be updated. In this way, the number of times data is rewritten can be reduced. Further, when the MPU 84 has a function of holding the memory contents even in the stop mode, the storage process becomes unnecessary.

In step S28, the power control unit 202 deactivates the operating mode of the MPU 84. Specifically, the stop mode in which the supply of a clock signal to the MPU 84 is stopped is set. Accordingly, the power consumption can be reduced, and the battery 88 can be used for a long period of time.

In the foregoing description, the deactivated state corresponds to the stop mode. Alternatively, the deactivated state may correspond to a power off mode in which the power supply is cut off. In this case, when a button is operated, an external switching circuit is activated, thereby further activating the MPU 84. When the power is to be turned off, a command from the MPU 84 turns off the switching circuit. Accordingly, the power supply to the MPU 84 is stopped, and the power is turned off.

Alternatively, the deactivated state may correspond to a halt mode in which the MPU 84 is halted although a clock signal is being supplied or a sleep mode in which the speed of a clock signal is slower than that in a normal mode. In short, in the deactivated state, it is only necessary to cause the input device 31 to enter a low power consumption state.

The process of turning off the activation power of the sensor 71 and/or 72 in step S26 may be executed after the termination process in step S27. However, the power consumption can be more greatly reduced when the process of turning off the activation power of the sensors 71 and/or 72 is executed at an earlier stage.

In the embodiment in FIG. 7, power is supplied to the input device 31 from when a button is operated to when the input device 31 is placed. Since power is continually supplied to the sensors 71 and 72, the outputs of the sensors 71 and 72 become stable. For example, the output of the angular velocity sensor 71 is unstable immediately after the activation. However, in the present embodiment, it becomes unnecessary to use such an unstable output.

In the foregoing description, when the input device 31 has been placed for the certain time, the GUI termination command is sent in step S25 of FIG. 7. When the television receiver 10 receives the GUI termination command, the GUI display is disabled in step S156 of FIG. 13.

However, immediately after the user places the input device 31, the user may change his/her mind and hold the input device 31 again for displaying the GUI. At this time, when the user is asked to re-operate the GUI start button in order to enable the GUI display, the user feels that this is inconvenient. When the GUI display is not disabled for a long time after the user has placed the input device 31, the user may mistakenly recognize that the input device 31 is broken. However, to prevent a wrong detection, it is necessary to check that the input device 31 has been continuously placed for a certain time or longer.

Therefore, the time from when the input device 31 is placed to when the input device 31 enters a low power consumption state (first time) can be set to a relatively long time, such as 20 seconds. A time from when the input device 31 is placed to when the GUI termination command is sent to disable the GUI display (second time) can be set to a relatively short time, such as 0.5 second to 2 seconds. In this case, after the input device 31 is placed, when the input device 31 is held again before the input device 31 enters a low power consumption state (that is, within the first time), the acceleration sensor 72 and the angular velocity sensor 71 can detect this holding. When it is detected that the input device 31 is held again (that is, when it is detected that the input device 31 is not placed), a GUI activation command is sent.

In this manner, when the second time (relatively short time) elapses after placing of the input device 31 is detected, the GUI display is disabled. However, when the input device 31 is held again within the first time (relatively long time) after placing of the input device 31 is detected, the GUI display will be automatically enabled even when the GUI start button is not operated. After the first time elapses since placing of the input device 31 is detected, the GUI display will not be enabled when the input device 31 is simply held again. The GUI display will be enabled only when the GUI start button is operated. Accordingly, the ease of operation can be improved.

Placing Detecting Process

Figure 12:
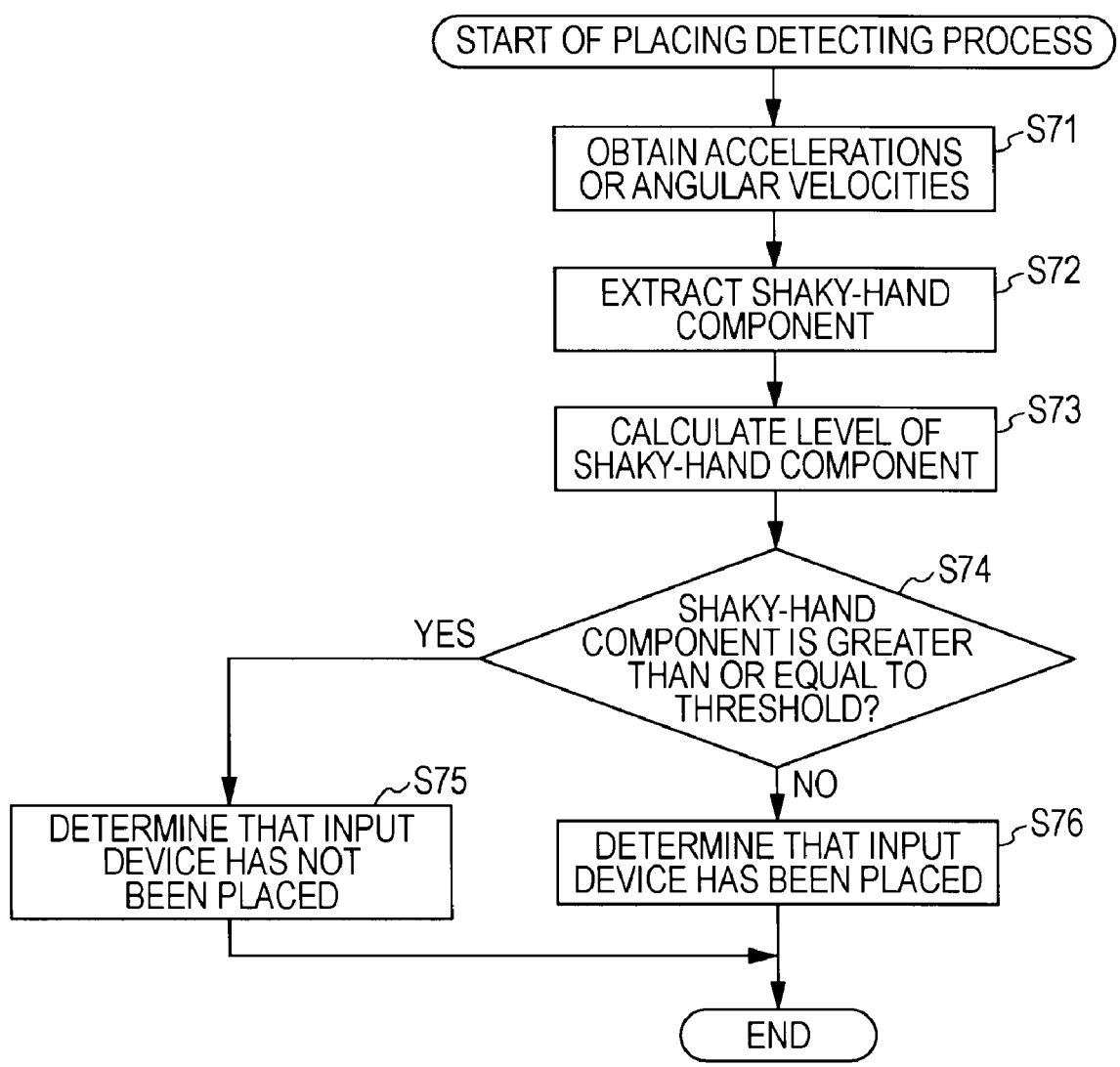
FIG. 12 is a flowchart describing a placing detecting process.

FIG. 12 is a flowchart describing a placing detecting process. Referring now to the flowchart, the placing detecting process will be described. This process is executed in, for example, the process of determining whether the input device 31 has been placed in step S19 of FIG. 7 (and in step S209 of FIG. 18 described later).

In step S71, the obtaining unit 207 obtains accelerations or angular velocities output by the acceleration sensor 72 or the angular velocity sensor 71. In step S72, the obtaining unit 207 extracts a shaky-hand component from the accelerations or angular velocities obtained in step S71. For example, DC components are cut off by using a high-pass filter included in the obtaining unit 207, thereby extracting a frequency component from 1 Hz to 30 Hz as a shaky-hand component when the user has operated the main body 32. A specific cut-off frequency can be determined on the basis of an experiment.

In step S73, the calculation unit 208 calculates the level of the shaky-hand component. In step S74, the determination unit 201 determines whether the shaky-hand component is greater than or equal to a threshold. That is, whether the level at the peak in the time axis or the frequency axis of the shaky-hand component calculated in step S73 is greater than or equal to a preset threshold is determined.

Figure 18:
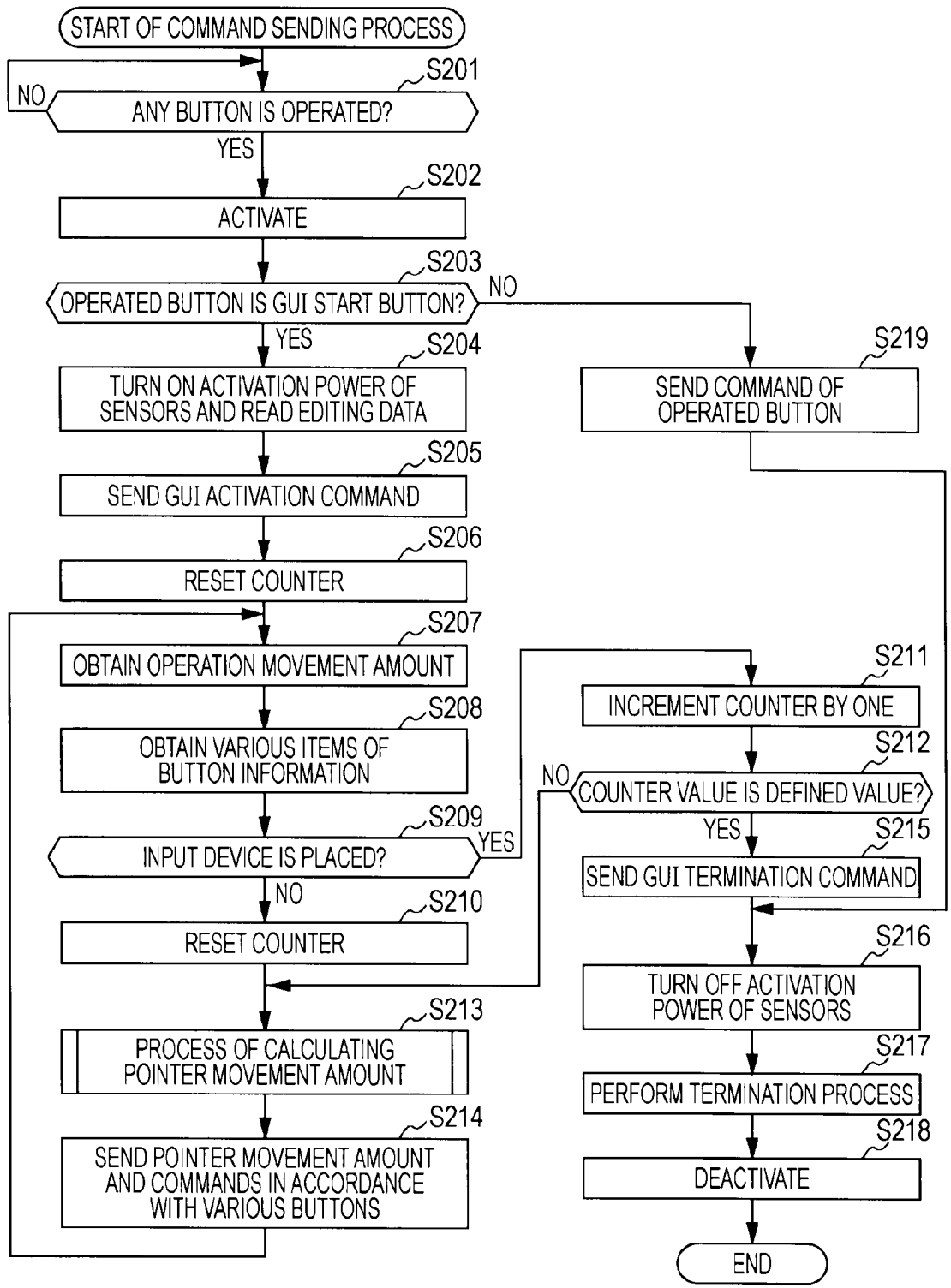
FIG. 18 is a flowchart describing another command sending process.

When the level of the shaky-hand component calculated in step S73 is greater than or equal to the preset threshold, the determination unit 201 determines in step S75 that the main body 32 has not been placed. That is, it is determined that the main body 32 is being held. In this case, for example, in FIG. 7, the flow proceeds from step S19 to step S20. In FIG. 18 described later, the flow proceeds from step S209 to step S210.

In contrast, when it is determined that the level of the shaky-hand component calculated in step S73 is less than the preset threshold, the determination unit 201 determines in step S76 that the main body 32 has been placed. In this case, for example, in FIG. 7, the flow proceeds from step S19 to step S21. In FIG. 18 described later, the flow proceeds from step S209 to step S211.

In the foregoing manner, whether the input device 31 has been placed is determined on the basis of accelerations or angular velocities.

Figure 19:
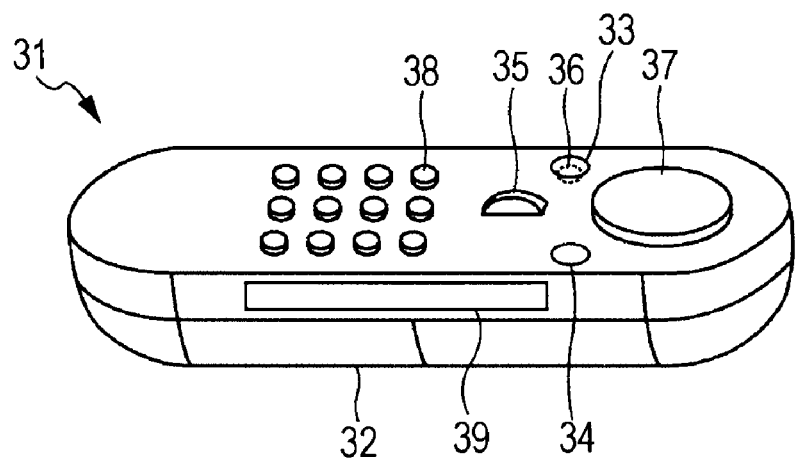
FIG. 19 is a perspective view illustrating a structure of another input device in an embodiment.
Figure 20A:
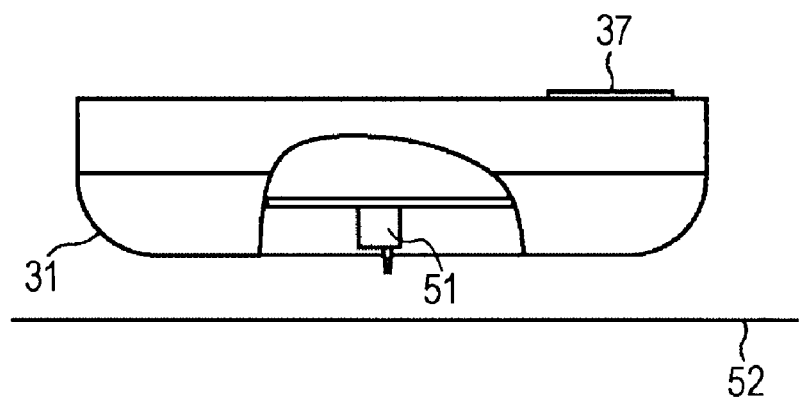
FIGS. 20A and 20B are partial cross-sectional views illustrating a structure of another input device in an embodiment.
Figure 20B:
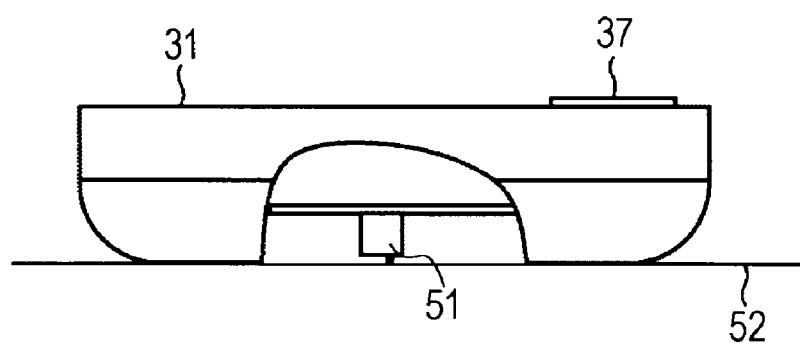
Figure 21A:
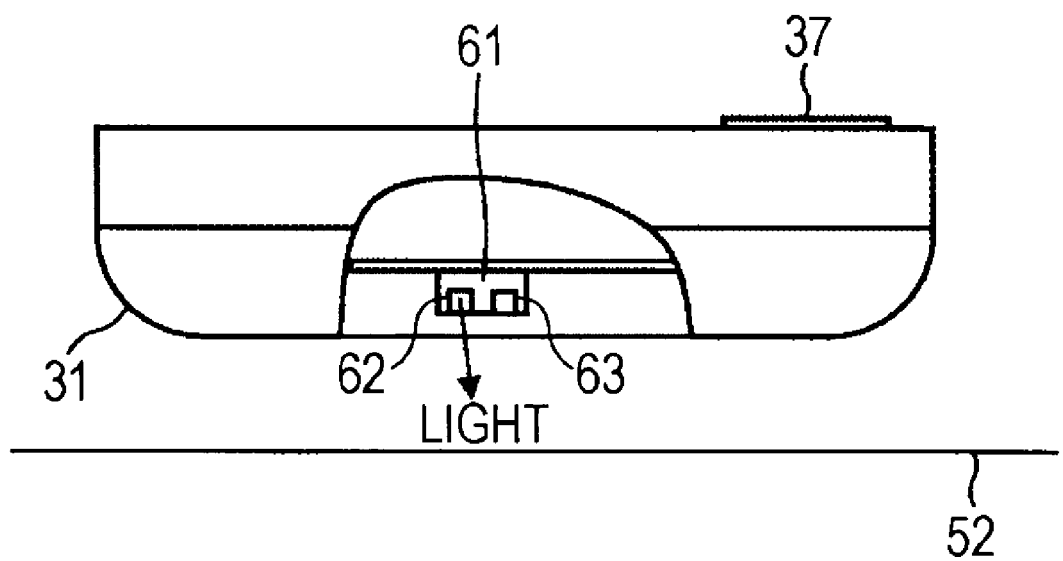
FIGS. 21A and 21B are partial cross-sectional views illustrating a structure of another input device in an embodiment.

When accelerations or angular velocities detected by the acceleration sensor 72 or the angular velocity sensor 71 are used in placing detection as above, it becomes unnecessary to provide a detection unit 39 in FIG. 19, a push switch 51 in FIGS. 20A and 20B, and an optical detection element 61 in FIGS. 21A and 20B. The structure becomes simpler, thus making it possible to reduce the size and cost. Regardless of the place where the input device 31 is held or the position where the input device 31 is placed, whether the input device 31 is being held or placed can be certainly detected.

When the sensors 71 and/or 72 are/is functioning, whether the input device 31 is being held or placed can be detected on the basis of an output(s) of the sensors 71 and/or 72. However, if the input device 31 enters a low power consumption state when the input device 31 is placed, no power is supplied to the acceleration sensor 72 or the angular velocity sensor 71. As a result, a change from a state in which the input device 31 is placed to a state in which the input device 31 is held becomes undetectable by using the sensors 71 and/or 72. In the present embodiment, for example, as has been described with reference to steps S11 and S13 in FIG. 7, a change from a state in which the input device 31 is placed to a state in which the input device 31 is held is detected from an operation of any button of the input device 31.

Display Controlling Process Performed by Television Receiver

When the input device 31 sends a remote control signal as above, the television receiver 10 executes a process corresponding to the signal. A display controlling process of controlling display of an object selected using a virtual pointer will be described as an example of the process executed by the television receiver 10.

FIG. 13 is a flowchart describing the display controlling process. In step S151, the receiving unit 251 receives a pointer movement amount and commands. Specifically, a pointer movement amount and commands sent from the input device 31 in step S24 of FIG. 7 (or step S214 of FIG. 18 described later) are received by the receiving unit 12 via the antenna 11, demodulated, and obtained by the MPU 13.

In step S152, the determination unit 252 determines whether a pointer is movable. Since the input device 31 is operated in any direction in the three-dimensional free space, the pointer 22 may move in response to a shaky hand of the user, which is an unintentional operation. In the present embodiment, when the user intentionally operates the input device 31 in order to move the pointer 22, the user enters an operation while allowing the proximity detector 36 to detect a finger. In contrast, when the user intentionally operates the input device 31 in order to move the pointer 22, the user may enter an operation while not allowing the proximity detector 36 to detect a finger. Whether the proximity detector 36 is detecting a finger or not can be determined from button information that is obtained in step S18 of FIG. 7 (or step S208 of FIG. 18 described later) and sent to the television receiver 10.

When the pointer 22 is movable, the computing unit 253 computes, in step S153, a virtual pointer position from the pointer movement amount. For example, a virtual pointer position (X(t), Y(t)) is computed from a pointer movement amount (ΔX, ΔY) from a pointer position a time ago on the basis of the following equation:

$$(X(t), Y(t)) = (X(t-\alpha)+\Delta X, Y(t-\alpha)+\Delta Y) \quad (4)$$

In step S154, the display control unit 256 activates an object corresponding to the virtual pointer position (causes an object corresponding to the virtual pointer position to enter a selected state). This activation will be described below.

Figure 14:
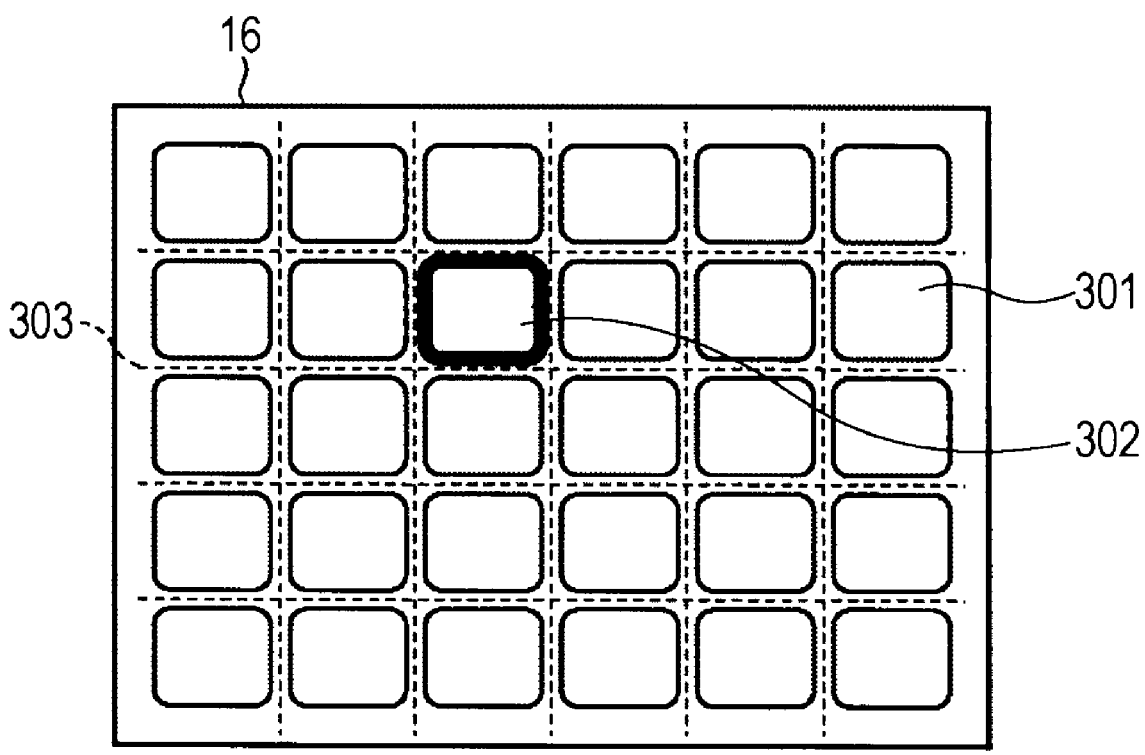
FIG. 14 is a diagram describing a selected object.

FIG. 14 is a diagram describing a selected object. As illustrated in FIG. 14, it is assumed that a plurality of objects 301 is displayed on the output unit 16. Each of the objects 301 is segmented by a virtual and invisible boundary 303. One object 302 is selected by the user from among the objects 301. The selected object 302 is highlighted or displayed with a frame therearound so as to be distinguishable from the other objects 301. This state is the activated state.

Figure 15A:
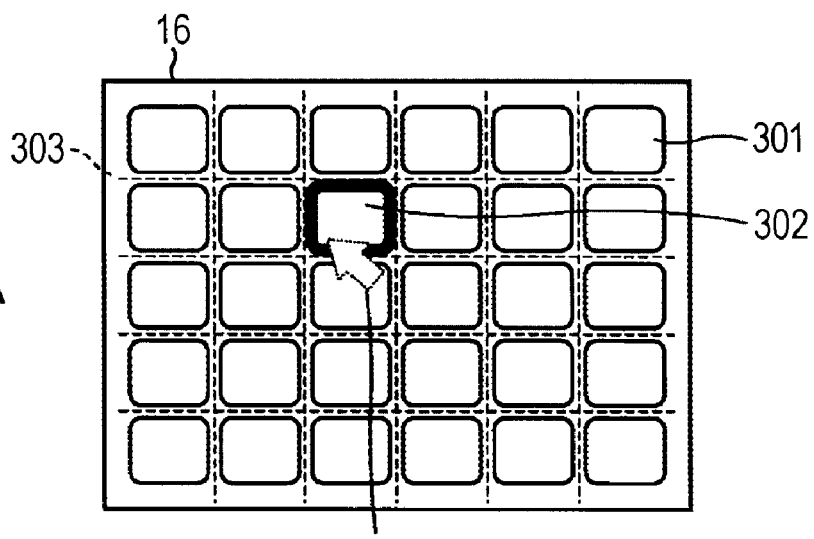
FIGS. 15A, 15B, and 15C are diagrams describing a change of the selected object.
Figure 15B:
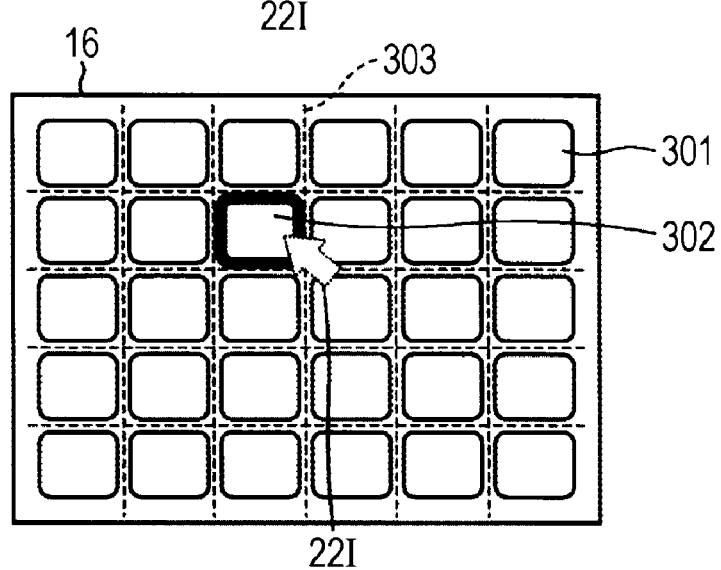
Figure 15C:
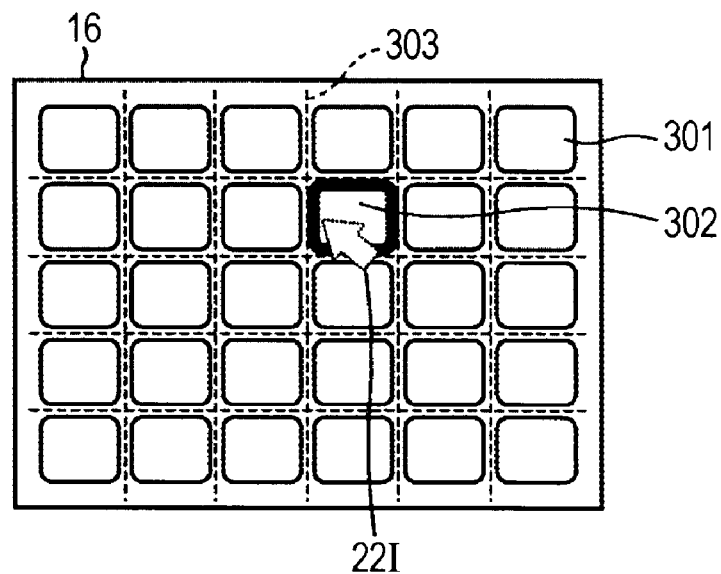

FIGS. 15A to 15C are diagrams describing a change of the selected object. As illustrated in FIGS. 15A to 15C, an invisible virtual pointer 22I is placed on the selected object 302. In other words, an object where the virtual pointer 22I is placed is the selected object 302. Therefore, when the user operates the input device 31 in the horizontal direction, as illustrated in FIG. 15B, the virtual pointer 22I virtually moves in the horizontal direction, which is the operated direction. As illustrated in FIG. 15C, when the virtual pointer 22I moves to the position of the next object, a new object where the virtual pointer 22I is placed is activated as the selected object 302. That is, in this case, the selected object 302 has moved by one object to the right.

Referring back to FIG. 13, when it is determined in step S152 that the pointer 22 is not movable, specifically, when the proximity detector 36 is not detecting a finger, the resetting unit 254 resets, in step S155, the virtual pointer position to a certain object of the activated object. The position may be a certain predetermined position.

Figure 16A:
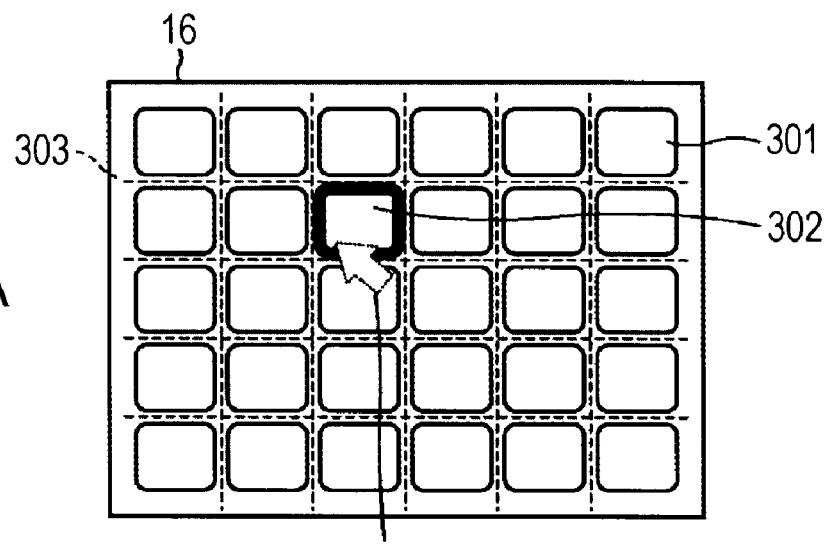
FIGS. 16A, 16B, and 16C are diagrams describing the relationship between a virtual pointer and an object border.
Figure 16B:
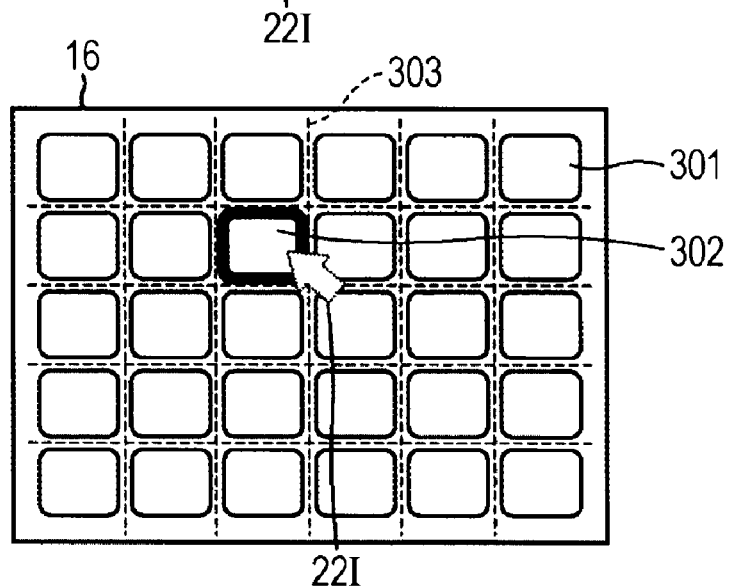
Figure 16C:
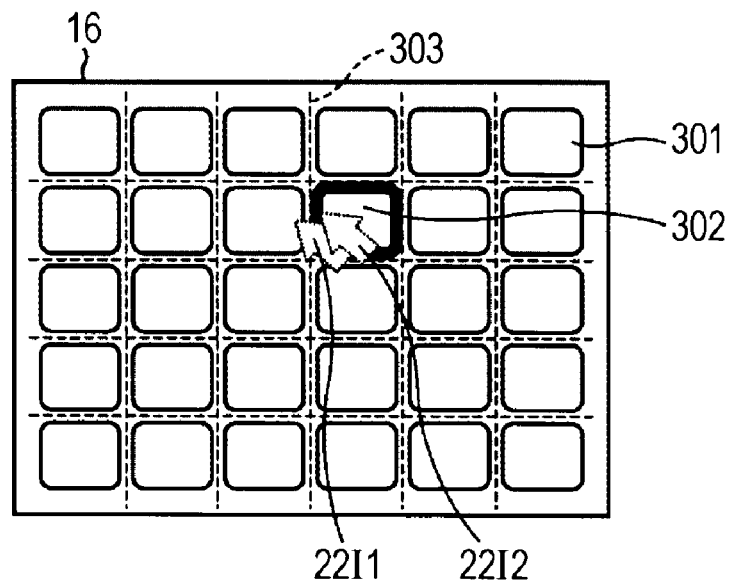

FIGS. 16A to 16C are diagrams describing the relationship between a virtual pointer and an object border. For example, in FIG. 16A, the head of the virtual pointer 22I is positioned on slightly the left side of the horizontal center of the selected object 302. When the user operates the input device 31 in the horizontal direction, the virtual pointer 22I moves from the position illustrated in FIG. 16A to a position illustrated in FIG. 16B (position on slightly the right side of the position in FIG. 16A). At this time, it is assumed that the user cancels the operation on the proximity detector 36. When the operation on the proximity detector 36 is cancelled, that is, when a finger is stopped being detected by the proximity detector 36, the movement of the virtual pointer 22I is terminated at that position. As illustrated in FIG. 16B, at this time, the virtual pointer 22I is positioned near the boundary 303 on the right side of the selected object 302.

It is assumed that, in the state illustrated in FIG. 16B, the user again operates the input device 31 in the horizontal and rightward direction while allowing the proximity detector 36 to detect a finger. Since the virtual pointer 22I is positioned near the boundary 303, the virtual pointer 22I goes beyond the boundary 303 even when the user slightly operates the input device 31 in the horizontal direction. That is, as illustrated in FIG. 16C, when a pre-movement virtual pointer 22I1 reaches the position of a post-movement virtual pointer 22I2, although the moved distance is short, the virtual pointer 22I2 becomes associated with an object different from that of the virtual pointer 22I1. Therefore, the selected object 302 is changed from the object associated with the virtual pointer 22I1 to the object associated with the virtual pointer 22I2.

The distance moved from the virtual pointer 22I1 to the virtual pointer 22I2 in FIG. 16C is shorter than the distance moved from the virtual pointer 22I in FIG. 16A to the virtual pointer 22I in FIG. 16B. However, in the example illustrated in FIGS. 16A and 16B, although the user has operated the input device 31 by a longer distance, the selected object 302 is not changed. In contrast, in the example illustrated in FIGS. 16B and 16C, although the user has operated the input device 31 by a short distance, the user receives an impression that the selected object 302 is changed. This causes the user to feel awkwardness in the operation.

In the present embodiment, when it is determined in step S152 that the pointer is not movable, that is, when the operation on the proximity detector 36 has been cancelled, in step S155, the position of the virtual pointer 22I is reset to a certain position of the selected object 302.

Figure 17A:
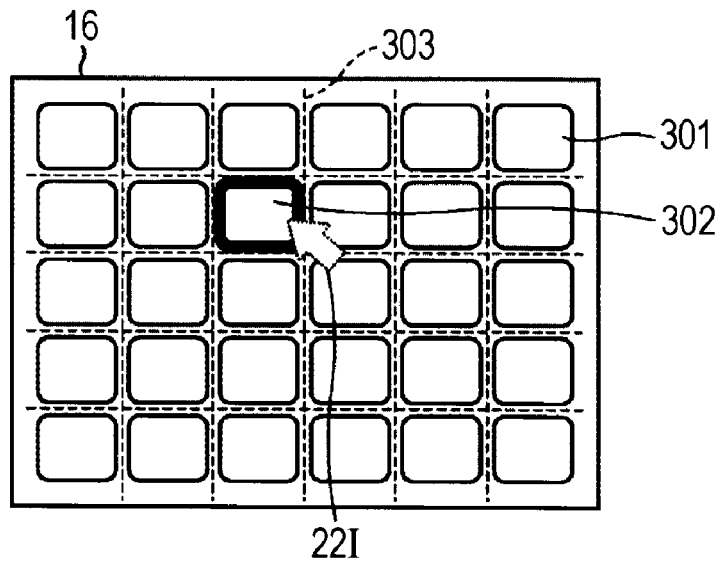
FIGS. 17A, 17B, and 17C are diagrams describing resetting of the virtual pointer.
Figure 17B:
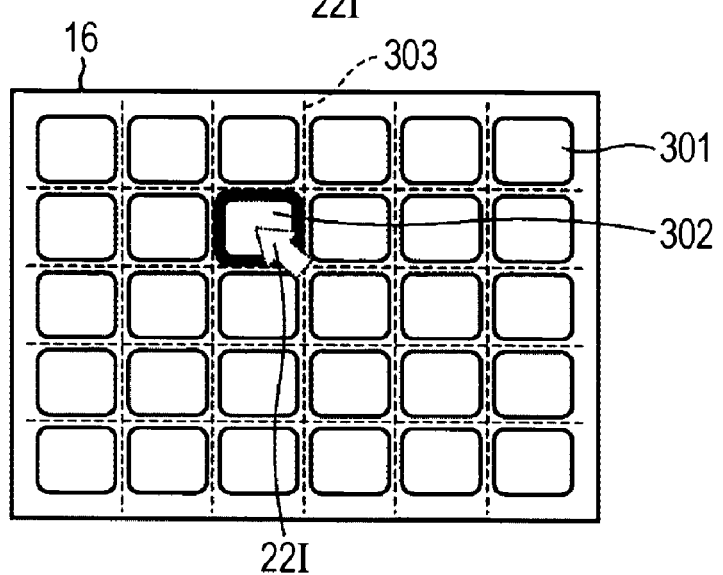
Figure 17C:
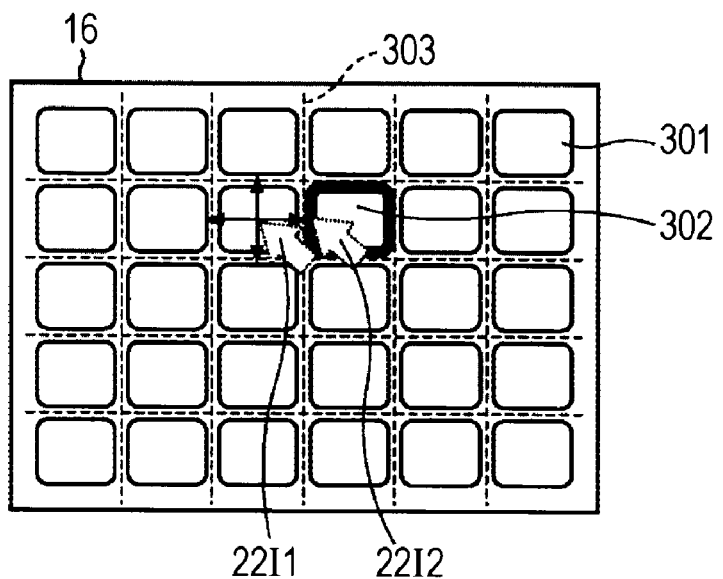

FIGS. 17A to 17C are diagrams describing resetting of a virtual pointer. As illustrated in FIG. 17A, the position of the virtual pointer 22I, which is determined as not movable, is changed to a certain position illustrated in FIG. 17B (in the present embodiment, the head of the virtual pointer 22I is placed on the position corresponding to the center of the object).

Therefore, as illustrated in FIG. 17C, the virtual pointer 22I1 in a still state is constantly positioned at the center of the selected object 302. As a result, regardless of a timing of cancelling the operation on the proximity detector 36, the distance between the virtual pointer 22I1 in a still state and the adjacent boundary 303 (distance until the post-movement virtual pointer 22I2 becomes associated with the adjacent object) becomes constantly fixed. This restrains the user from feeling awkwardness in the operation. The same corresponds to the case where the user selects a vertically adjacent object.

Referring back to FIG. 13, after the activation in step S154 and the resetting of the virtual pointer 22I in step S155 are performed, the execution unit 255 executes the commands in step S156. The commands are the commands received from the input device 31 in step S151.

For example, when a GUI activation command is received, the GUI display is enabled. When a GUI termination command is received, the GUI display is disabled.

Second Embodiment

Second Command Sending Process Performed by Input Device

FIG. 18 is a flowchart describing another command sending process. The processing in steps S201 to S218 of FIG. 18 is basically similar to the processing in steps S11 to S28 of FIG. 7.

In the embodiment illustrated in FIG. 18, after it is determined that the operated button is the GUI start button in step S203, which corresponds to step S14 in FIG. 7, the process of turning on the activation power of the sensors 71 and 72 and reading editing data is executed in step S204, which corresponds to step S13 in FIG. 7.

In the embodiment illustrated in FIG. 7, when it is determined in the determining process in step S14 that the operated button is not the GUI start button, the standby process is executed until the GUI start button is operated. However, in the embodiment illustrated in FIG. 18, when it is determined in step S203 that the operated button is not the GUI start button, the sending unit 205 promptly executes in step S219 a process of sending a command of the operated button. Thereafter in steps S216 to S218, as in the case of steps S26 to S28 of FIG. 7, the process of turning off the activation power of the sensors 71 and 72, the termination process, and the deactivation process are executed.

Since the other processes are the same as those in FIG. 7, descriptions thereof are omitted.

In the embodiment illustrated in FIG. 18, power is supplied only when a button of the input device 31 is being operated and when the GUI is being displayed. As a result, the time in which power is supplied becomes shorter, and hence, the power consumption can be reduced compared with the case of the embodiment illustrated in FIG. 7.

Third Embodiment
Structure of Input Device

FIG. 19 is a perspective view illustrating a structure of another input device in an embodiment. In the embodiment, the detection unit 39 for detecting holding of the main body 32 by the user is provided on a face other than the top face of the main body 32 (the right lateral face in the embodiment illustrated in FIG. 19). Unlike the top face, the right lateral face of the main body 32 is highly likely to be touched by a finger when the user holds the main body 32. By providing the detection unit 39 on the right lateral face, the user's holding, that is, placing of the input device 31, can be certainly detected.

Alternatively, the detection unit 39 may be additionally provided on the left lateral face of the main body 32. When two detection units 39 are provided on the two lateral faces, holding of the main body 32 by the user can be more certainly detected.

The detection unit 39 detects that the main body 32 is placed on the basis of the fact that there is substantially no physical contact or approach of the main body 32 to another object (a finger of a human being in the embodiment). The detection unit 39 can be configured using, for example, a pressure-sensitive sheet switch, a capacitive sensor, or an optical proximity sensor.

In the embodiment, the determination unit 201 determines, in step S19 of FIG. 7 or step S209 of FIG. 18, whether the input device 31 has been placed, in accordance with an output of the detection unit 39 serving as a detection unit that detects placing of an operation unit on the basis of physical contact or approach of the operation unit to another object.

Fourth Embodiment
Structure of Input Device

FIGS. 20A and 20B are partial cross-sectional views illustrating a structure of yet another input device in an embodiment. As illustrated in FIG. 20A, the push switch 51 serving as an element that operates when placed is provided on a face other than the top face of the main body 32 (in the embodiment illustrated in FIG. 20A and FIG. 20B, the bottom face facing the top face where the buttons 38 are provided). When the user holds the input device 31, the input device 31 is separated from a table 52. This turns on (or off) the push switch 51.

In contrast, as illustrated in FIG. 20B, when the input device 31 is placed on the table 52, the push switch 51 is pressed by the table 52 and thus is turned on (or off). Accordingly, whether the input device 31 has been placed on the table 52 can be detected.

In this manner, the push switch 51 detects placing of the main body 32 on the basis of physical contact of the main body 32 with another object (the table 52 in the case illustrated in FIGS. 20A and 20B). Since the push switch 51 is provided on the bottom face of the main body 32, placing of the input device 31 on the table 52 can be quickly and certainly detected.

In the embodiment, the determination unit 201 determines, in step S19 of FIG. 7 or step S209 of FIG. 18, whether the input device 31 has been placed, in accordance with an output of the push switch 51 serving as a detection unit that detects placing of an operation unit on the basis of physical contact of the operation unit with another object.

Fifth Embodiment
Structure of Input Device

Figure 21B:
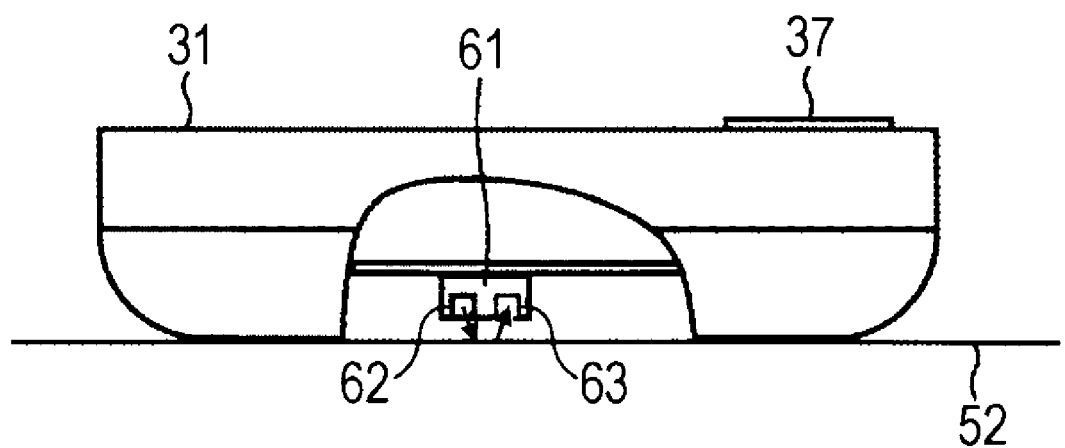

FIGS. 21A and 21B are partial cross-sectional views illustrating a structure of yet another input device in an embodiment. As illustrated in FIG. 21A, the optical detection element 61 serving as an element that operates when placed is provided on a face other than the top face of the main body 32 (the bottom face in the embodiment illustrated in FIG. 21). When the user holds the input device 31, the input device 31 is separated from the table 52. Accordingly, light emitted from a light-emitting diode (LED) 62 included in the optical detection element 61 and reflected from the table 52 becomes undetectable by a photo-detector 63.

As illustrated in FIG. 21B, when the input device 31 is placed on the table 52, light emitted from the LED 62 and reflected from the table 52 is detected by the photo-detector 63. Therefore, whether the input device 31 has been placed on the table 52 can be detected in accordance with the presence or absence of reflected light.

In principle, the optical detection element 61 can detect reflected light even when the optical detection element 61 is not in contact with the table 52. However, a physical contact state is detected, taking into consideration a threshold for detection. Since the optical detection element 61 is provided on the bottom face of the main body 32, placing of the input device 31 on the table 52 can be quickly and certainly detected.

In the embodiment, the determination unit 201 determines, in step S19 of FIG. 7 or step S209 of FIG. 18, whether the input device 31 has been placed, in accordance with an output of the optical detection element 61 serving as a detection unit that detects placing of an operation unit on the basis of physical contact of the operation unit with another object.

Modifications

Although the information processing apparatus operated by the input device 31 has been described as the television receiver 10, an embodiment of the present invention is applicable to the case where other information processing apparatuses are controlled.

Furthermore, when an information processing apparatus to be controlled is a mobile information processing apparatus such as a cellular phone or a personal digital assistant (PDA), the input device 31 may be a structure separate from the mobile information processing apparatus or may be integrated with the mobile information processing apparatus. When the mobile information processing apparatus is integrated with the mobile information processing apparatus, an input is entered by operating the entire mobile information processing apparatus in a certain direction.

Although the pointer movement operations have been described above, the ease of operation can be similarly improved when an embodiment of the present invention is applied to other GUI screen operations such as scrolling, zooming (enlargement or size reduction), and rotation.

A series of processes described above can be executed by hardware or software. When the series of processes is executed by software, for example, a computer in which a program constituting the software executes the program.

In the present specification, steps describing the program include processes that are performed time sequentially in accordance with the order described in the specification, and may include processes that are not necessarily performed time sequentially, but are performed in parallel or individually.

In the present specification, a system represents the entire apparatus including a plurality of apparatuses.

The present application contains subject matter related to that disclosed in Japanese Priority Patent Application JP 2009-037458 filed in the Japan Patent Office on Feb. 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
   an operation unit configured to be held by a user and to be operated in a three-dimensional free space so as to remotely operate an information processing apparatus;
   a sending unit configured to send a command that disables display of a graphical user interface of the information processing apparatus when the operation unit is placed, and to send a command that enables display of the graphical user interface of the information processing apparatus when a button of the operation unit is operated; and
   a power control unit configured to cause the input device to enter a low power consumption state when the operation unit is placed.

2. The input device according to claim 1, wherein holding or placing of the operation unit is detected from an output of a sensor that detects an operation entered by using the operation unit in the free space.

3. The input device according to claim 2, wherein the sensor that detects an operation entered by using the operation unit in the free space is an acceleration sensor.

4. The input device according to claim 3, wherein the power control unit turns off activation power of the acceleration sensor when a first time elapses after the operation unit is placed.

5. The input device according to claim 4, wherein the sending unit sends a command that disables display of the graphical user interface of the information processing apparatus when the first time elapses after the operation unit is placed.

6. The input device according to claim 4, wherein the sending unit sends a command that disables display of the graphical user interface of the information processing apparatus when a second time that is shorter than the first time elapses after the operation unit is placed.

7. The input device according to claim 6, wherein the sending unit sends a command that enables the graphical user interface of the information processing apparatus when the operation unit is held again within the first time.

8. The input device according to claim 2, wherein the sensor that detects an operation entered by using the operation unit in the free space is an angular velocity sensor.

9. The input device according to claim 8, wherein the power control unit turns off activation power of the angular velocity sensor when a first time elapses after the operation unit is placed.

10. The input device according to claim 9, wherein the sending unit sends a command that disables display of the graphical user interface of the information processing apparatus when the first time elapses after the operation unit is placed.

11. The input device according to claim 9, wherein the sending unit sends a command that disables display of the graphical user interface of the information processing apparatus when a second time that is shorter than the first time elapses after the operation unit is placed.

12. The input device according to claim 11, wherein the sending unit sends a command that enables the graphical user interface or the information processing apparatus when the operation unit is held again within the first time.

13. The input device according to claim 1, further comprising a detection unit configured to detect placing of the operation unit on the basis of physical contact of the operation unit with another object.

14. The input device according to claim 2, wherein the operation unit includes the entirety of the input device.

15. The input device according to claim 14, wherein the input device is integrated with the information processing apparatus.

16. An input method for an input device including an operation unit, a sending unit, and a power control unit, the input method comprising:
   holding the operation unit by a user and operating the operation unit in a three-dimensional free space so as to remotely operate an information processing apparatus;
   sending, by using the sending unit, a command that disables display of a graphical user interface of the information processing apparatus when the operation unit is placed, and a command that enables display of the graphical user interface of the information processing apparatus when a button of the operation unit is operated; and
   causing, by using the power control unit, the input device to enter a low power consumption state when the operation unit is placed.

17. A non-transitory computer program product having instructions stored therein that when executed by a processor implement a device comprising:
   an operation unit configured to be held by a user and to be operated in a three-dimensional free space so as to remotely operate an information processing apparatus;
   sending unit configured to send a command that disables display of a graphical user interface of an information processing apparatus when the operation unit is placed, and for sending a command that enables display of the graphical user interface of the information processing apparatus when a button of the operation unit is operated; and
   a power control unit that causes the input device to enter a low power consumption state when the operation unit is placed.

18. An information processing system comprising:
   an input device; and
   an information processing apparatus configured to be controlled by a remote control signal from the input device,
   wherein the input device includes
      an operation unit configured to be held by a user and to be operated in a three-dimensional free space so as to remotely operate the information processing apparatus,
      a sending unit configured to send a first command that disables display of a graphical user interface of the information processing apparatus when the operation unit is placed, and to send a second command that enables display of the graphical user interface of the information processing apparatus when a button of the operation unit is operated, and a power control unit configured to cause the input device to enter a low power consumption state when the operation unit is placed, and wherein the information processing apparatus includes a receiving unit configured to receive the first command and the second command, and an execution unit configured to disable display of the graphical user interface when the first command is received, and to enable display of the graphical user interface when the second command is received.

* * * * *